United States Patent
Bye et al.

(10) Patent No.: US 9,183,412 B2
(45) Date of Patent: Nov. 10, 2015

(54) SYSTEMS AND METHODS FOR PROVISIONING AND USING MULTIPLE TRUSTED SECURITY ZONES ON AN ELECTRONIC DEVICE

(75) Inventors: Stephen J. Bye, Atlanta, GA (US); Lyle W. Paczkowski, Mission Hills, KS (US); William M. Parsel, Overland Park, KS (US); Carl J. Persson, Olathe, KS (US); Matthew C. Schlesener, Shawnee, KS (US); Trevor D. Shipley, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/571,348

(22) Filed: Aug. 10, 2012

(65) Prior Publication Data
US 2014/0047548 A1   Feb. 13, 2014

(51) Int. Cl.
*G06F 7/04* (2006.01)
*G06F 21/74* (2013.01)

(52) U.S. Cl.
CPC ..................................... *G06F 21/74* (2013.01)

(58) Field of Classification Search
CPC .......... G06F 12/14; G06F 2009/45587; G06F 21/00; G06F 21/121; G06F 21/57; G06F 21/53; G06F 2221/2149; G06Q 20/3576; G06Q 20/35765; H04L 63/105; H04L 63/20
USPC ............................ 713/166, 187; 718/1; 726/26
See application file for complete search history.

(56) References Cited

U.S. PATENT DOCUMENTS

| | | | |
|---|---|---|---|
| 5,303,378 | A | 4/1994 | Cohen |
| 5,321,735 | A | 6/1994 | Breeden et al. |
| 5,764,889 | A | 6/1998 | Ault et al. |
| 5,796,952 | A | 8/1998 | Davis et al. |
| 5,950,200 | A | 9/1999 | Sudai et al. |
| 6,064,975 | A | 5/2000 | Moon et al. |
| 6,131,024 | A | 10/2000 | Boltz |
| 6,177,860 | B1 | 1/2001 | Cromer et al. |
| 6,186,553 | B1 | 2/2001 | Phillips et al. |

(Continued)

FOREIGN PATENT DOCUMENTS

| | | | |
|---|---|---|---|
| WO | 2009056148 A1 | 5/2009 | |
| WO | WO2011025433 A1 | 3/2011 | |

(Continued)

OTHER PUBLICATIONS

Ackerman, Samuel K., "Lecture Slides: Mapping User Interface Design to Culture Dimensions", Aaron Marcus and Associates, Inc., 2001.

(Continued)

*Primary Examiner* — Farid Homayounmehr
*Assistant Examiner* — Lizbeth Torres-Diaz

(57) ABSTRACT

A method of provisioning a subordinate trusted security zone in a processor having a trusted security zone. The method comprises receiving by a master trusted application executing in a master trusted security zone of the processor a request to provision a subordinate trusted security zone in the processor, wherein the request comprises a master trusted security zone key, wherein the request designates the subordinate trusted security zone, and wherein the request defines an independent key. The method further comprises provisioning by the master trusted application the subordinate trusted security zone to be accessible based on the independent key.

20 Claims, 9 Drawing Sheets

(56) References Cited

U.S. PATENT DOCUMENTS

| | | |
|---|---|---|
| 6,219,712 B1 | 4/2001 | Mann et al. |
| 6,356,838 B1 | 3/2002 | Paul |
| 6,363,150 B1 | 3/2002 | Bhagavath et al. |
| 6,477,180 B1 | 11/2002 | Aggarwal et al. |
| 6,507,904 B1 | 1/2003 | Ellison et al. |
| 6,614,893 B1 | 9/2003 | Paiz |
| 6,622,016 B1 | 9/2003 | Sladek et al. |
| 6,647,260 B2 | 11/2003 | Dusse et al. |
| 6,668,322 B1 | 12/2003 | Wood et al. |
| 6,691,230 B1 | 2/2004 | Bardon |
| 6,754,784 B1 | 6/2004 | North et al. |
| 6,823,454 B1 | 11/2004 | Hind et al. |
| 6,824,064 B2 | 11/2004 | Guthery et al. |
| 6,895,234 B1 | 5/2005 | Laursen et al. |
| 6,978,132 B1 | 12/2005 | Sladek et al. |
| 6,986,107 B2 | 1/2006 | Hanggie et al. |
| 7,031,437 B1 | 4/2006 | Parsons et al. |
| 7,043,241 B1 | 5/2006 | Sladek et al. |
| 7,072,653 B1 | 7/2006 | Sladek et al. |
| 7,073,130 B2 | 7/2006 | Novak et al. |
| 7,215,754 B1 | 5/2007 | Woodson et al. |
| 7,260,382 B1 | 8/2007 | Lamb et al. |
| 7,260,386 B1 | 8/2007 | Haldar et al. |
| 7,366,806 B2 | 4/2008 | Milenkovic et al. |
| 7,387,240 B2 | 6/2008 | Ziegler |
| 7,500,198 B2 | 3/2009 | Mathews et al. |
| 7,519,824 B1 | 4/2009 | Peyravian et al. |
| 7,552,467 B2 | 6/2009 | Lindsay |
| 7,558,953 B2 | 7/2009 | Osthoff et al. |
| 7,571,364 B2 | 8/2009 | Whetsel |
| 7,650,645 B1 | 1/2010 | Langendorf et al. |
| 7,702,322 B1 | 4/2010 | Maurya et al. |
| 7,716,720 B1 | 5/2010 | Marek et al. |
| 7,873,837 B1 | 1/2011 | Lee et al. |
| 7,895,642 B1 | 2/2011 | Larson et al. |
| 7,921,303 B2 | 4/2011 | Mauro, II |
| 7,930,636 B2 | 4/2011 | Garbow et al. |
| 7,970,386 B2 | 6/2011 | Bhat et al. |
| 8,012,219 B2 | 9/2011 | Mendez et al. |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,150,962 B1 | 4/2012 | Wolter |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,244,277 B1 | 8/2012 | Cha et al. |
| 8,265,658 B2 | 9/2012 | Issa et al. |
| 8,270,310 B2 | 9/2012 | Raleigh |
| 8,270,941 B2 | 9/2012 | Kenagy et al. |
| 8,271,336 B2 | 9/2012 | Mikurak |
| 8,315,198 B2 | 11/2012 | Corneille et al. |
| 8,316,237 B1 | 11/2012 | Felsher et al. |
| 8,359,016 B2 | 1/2013 | Lindeman et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 * | 8/2013 | Cope et al. ............... 455/550.1 |
| 8,533,605 B1 | 9/2013 | Cha et al. |
| 8,538,398 B2 | 9/2013 | Wilson et al. |
| 8,559,933 B1 | 10/2013 | Delker et al. |
| 8,577,334 B1 | 11/2013 | Smith et al. |
| 8,583,091 B1 | 11/2013 | Delker et al. |
| 8,588,749 B1 | 11/2013 | Sadhvani et al. |
| 8,589,911 B1 | 11/2013 | Sharkey et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,667,607 B2 | 3/2014 | Paczkowski et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 | 5/2014 | Paleja et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 | 8/2014 | Garcia Martin et al. |
| 8,811,971 B2 | 8/2014 | Corda et al. |
| 8,819,639 B2 | 8/2014 | Schumacher |
| 8,831,998 B1 | 9/2014 | Cramer et al. |
| 8,838,087 B1 | 9/2014 | Delker et al. |
| 8,839,460 B2 | 9/2014 | Shirlen et al. |
| 8,843,122 B1 | 9/2014 | Wick et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,232 B1 | 10/2014 | Tidd |
| 8,863,252 B1 | 10/2014 | Katzer et al. |
| 8,881,977 B1 | 11/2014 | Paczkowski et al. |
| 8,886,925 B2 | 11/2014 | Qureshi et al. |
| 8,954,041 B1 | 2/2015 | Delker et al. |
| 8,954,588 B1 | 2/2015 | Bertz et al. |
| 8,972,592 B1 | 3/2015 | Delker et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,027,102 B2 | 5/2015 | Katzer et al. |
| 9,043,446 B1 | 5/2015 | Davis et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,104,840 B1 | 8/2015 | Paczkowski et al. |
| 9,118,655 B1 | 8/2015 | Paczkowski et al. |
| 9,123,062 B1 | 9/2015 | Delker et al. |
| 2001/0041591 A1 | 11/2001 | Carroll |
| 2002/0029169 A1 | 3/2002 | Oki et al. |
| 2002/0035697 A1 | 3/2002 | McCurdy et al. |
| 2002/0054086 A1 | 5/2002 | Van Oostenbrugge et al. |
| 2002/0054150 A1 | 5/2002 | I'Anson et al. |
| 2002/0091569 A1 | 7/2002 | Kitaura et al. |
| 2002/0095389 A1 | 7/2002 | Gaines |
| 2002/0101444 A1 | 8/2002 | Novak et al. |
| 2002/0123335 A1 | 9/2002 | Luna et al. |
| 2002/0142760 A1 | 10/2002 | Gidron et al. |
| 2002/0156911 A1 | 10/2002 | Croman et al. |
| 2002/0166070 A1 | 11/2002 | Mualem et al. |
| 2002/0167542 A1 | 11/2002 | Florin |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 * | 12/2002 | Griffin et al. ............... 713/200 |
| 2003/0045273 A1 | 3/2003 | Pyhalammi et al. |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0216143 A1 | 11/2003 | Roese et al. |
| 2003/0229514 A2 | 12/2003 | Brown |
| 2003/0233329 A1 | 12/2003 | Laraki et al. |
| 2003/0237002 A1 | 12/2003 | Oishi et al. |
| 2004/0044752 A1 | 3/2004 | Hamaguchi et al. |
| 2004/0113940 A1 | 6/2004 | Brockway et al. |
| 2004/0158840 A1 | 8/2004 | Rothman et al. |
| 2004/0171375 A1 | 9/2004 | Chow-Toun |
| 2004/0179034 A1 | 9/2004 | Burritt |
| 2004/0181678 A1 | 9/2004 | Lee et al. |
| 2004/0202328 A1 | 10/2004 | Hara |
| 2004/0203941 A1 | 10/2004 | Kaplan et al. |
| 2004/0216054 A1 | 10/2004 | Mathews et al. |
| 2004/0233844 A1 | 11/2004 | Yu et al. |
| 2004/0234049 A1 | 11/2004 | Melideo |
| 2004/0243810 A1 | 12/2004 | Ringborg et al. |
| 2005/0015601 A1 | 1/2005 | Tabi |

(56) References Cited

U.S. PATENT DOCUMENTS

| | | |
|---|---|---|
| 2005/0045719 A1 | 3/2005 | Yang |
| 2005/0050474 A1 | 3/2005 | Bells et al. |
| 2005/0052994 A1 | 3/2005 | Lee |
| 2005/0055696 A1 | 3/2005 | Betzler et al. |
| 2005/0071780 A1 | 3/2005 | Muller et al. |
| 2005/0085272 A1 | 4/2005 | Anderson et al. |
| 2005/0091505 A1 | 4/2005 | Riley et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0181796 A1 | 8/2005 | Kumar et al. |
| 2005/0228892 A1 | 10/2005 | Riley et al. |
| 2005/0235166 A1 | 10/2005 | England et al. |
| 2005/0239481 A1 | 10/2005 | Seligmann |
| 2005/0272445 A1 | 12/2005 | Zellner |
| 2005/0289355 A1 | 12/2005 | Kitariev et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0048141 A1 | 3/2006 | Persson et al. |
| 2006/0085751 A1 | 4/2006 | O'Brien et al. |
| 2006/0092861 A1 | 5/2006 | Corday et al. |
| 2006/0129488 A1 | 6/2006 | Vincent |
| 2006/0150256 A1 | 7/2006 | Fanton et al. |
| 2006/0156026 A1 | 7/2006 | Utin |
| 2006/0164978 A1 | 7/2006 | Werner et al. |
| 2006/0171537 A1 | 8/2006 | Enright |
| 2006/0190569 A1 | 8/2006 | Neil et al. |
| 2006/0190605 A1 | 8/2006 | Franz et al. |
| 2006/0212853 A1 | 9/2006 | Sutardja |
| 2006/0224901 A1 | 10/2006 | Lowe |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2006/0277469 A1 | 12/2006 | Chaudhri et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0067738 A1 | 3/2007 | Flynt et al. |
| 2007/0078988 A1 | 4/2007 | Miloushev et al. |
| 2007/0079120 A1* | 4/2007 | Bade et al. ............. 713/166 |
| 2007/0088851 A1 | 4/2007 | Levkovitz et al. |
| 2007/0094273 A1 | 4/2007 | Fritsch et al. |
| 2007/0094691 A1 | 4/2007 | Gazdzinski |
| 2007/0109580 A1 | 5/2007 | Yoshida |
| 2007/0118880 A1* | 5/2007 | Mauro, II ............. 726/4 |
| 2007/0130156 A1 | 6/2007 | U. Tenhunen et al. |
| 2007/0143210 A1 | 6/2007 | Yeung et al. |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1* | 8/2007 | Mazzaferri et al. ............. 718/1 |
| 2007/0197261 A1 | 8/2007 | Humbel |
| 2007/0214332 A1 | 9/2007 | Sonoda et al. |
| 2007/0265023 A1 | 11/2007 | Bengtsson et al. |
| 2007/0268842 A1 | 11/2007 | Wang |
| 2007/0276969 A1 | 11/2007 | Bressy et al. |
| 2007/0277223 A1 | 11/2007 | Datta et al. |
| 2007/0282914 A1 | 12/2007 | Sivapragasam et al. |
| 2008/0005794 A1 | 1/2008 | Inoue et al. |
| 2008/0010133 A1 | 1/2008 | Pyhalammi et al. |
| 2008/0014867 A1 | 1/2008 | Finn |
| 2008/0020745 A1 | 1/2008 | Bae et al. |
| 2008/0022374 A1 | 1/2008 | Brown et al. |
| 2008/0034309 A1 | 2/2008 | Louch et al. |
| 2008/0051142 A1 | 2/2008 | Calvet et al. |
| 2008/0092057 A1 | 4/2008 | Monson et al. |
| 2008/0092213 A1 | 4/2008 | Wei et al. |
| 2008/0097793 A1 | 4/2008 | Dicks et al. |
| 2008/0108321 A1 | 5/2008 | Taaghol et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |
| 2008/0176538 A1 | 7/2008 | Terrill et al. |
| 2008/0188178 A1 | 8/2008 | Maugars et al. |
| 2008/0192714 A1 | 8/2008 | Kim et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0214172 A1 | 9/2008 | Anwer |
| 2008/0232259 A1 | 9/2008 | Thomson |
| 2008/0244758 A1 | 10/2008 | Sahita et al. |
| 2008/0276182 A1 | 11/2008 | Leow |
| 2008/0305775 A1 | 12/2008 | Aaltonen et al. |
| 2008/0319887 A1 | 12/2008 | Pizzi et al. |
| 2009/0017870 A1 | 1/2009 | An |
| 2009/0047923 A1 | 2/2009 | Jain et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0077495 A1 | 3/2009 | Bhat et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0181716 A1 | 7/2009 | Benco et al. |
| 2009/0182605 A1 | 7/2009 | Lappas et al. |
| 2009/0182634 A1 | 7/2009 | Park et al. |
| 2009/0186651 A1 | 7/2009 | You |
| 2009/0192915 A1 | 7/2009 | Fernandez |
| 2009/0193491 A1 | 7/2009 | Rao |
| 2009/0227290 A1 | 9/2009 | Chien |
| 2009/0228824 A1 | 9/2009 | Forstall et al. |
| 2009/0248445 A1 | 10/2009 | Harnick |
| 2009/0254753 A1 | 10/2009 | De Atley et al. |
| 2009/0260004 A1 | 10/2009 | Datta et al. |
| 2009/0271321 A1 | 10/2009 | Stafford |
| 2009/0281947 A1 | 11/2009 | Erel |
| 2009/0291674 A1 | 11/2009 | Choi |
| 2009/0300599 A1 | 12/2009 | Piotrowski |
| 2009/0307679 A1 | 12/2009 | Lee et al. |
| 2009/0312011 A1 | 12/2009 | Huomo et al. |
| 2009/0320028 A1 | 12/2009 | Gellerich et al. |
| 2010/0005196 A1 | 1/2010 | Wolff-Petersen |
| 2010/0030901 A1 | 2/2010 | Hallberg et al. |
| 2010/0031325 A1* | 2/2010 | Maigne et al. ............. 726/4 |
| 2010/0037204 A1 | 2/2010 | Lin et al. |
| 2010/0052844 A1 | 3/2010 | Wesby |
| 2010/0058431 A1 | 3/2010 | McCorkendale et al. |
| 2010/0060549 A1 | 3/2010 | Tsern |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0087175 A1 | 4/2010 | Roundtree |
| 2010/0115438 A1 | 5/2010 | Chu |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0184422 A1 | 7/2010 | Ahrens |
| 2010/0190469 A1 | 7/2010 | Vanderveen et al. |
| 2010/0190478 A1 | 7/2010 | Brewer et al. |
| 2010/0197219 A1 | 8/2010 | Issa et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0234051 A1 | 9/2010 | Holden et al. |
| 2010/0241847 A1 | 9/2010 | van der Horst et al. |

(56) References Cited

U.S. PATENT DOCUMENTS

| | | |
|---|---|---|
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0281427 A1 | 11/2010 | Ghosh et al. |
| 2010/0291896 A1* | 11/2010 | Corda .......................... 455/410 |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072121 A1 | 3/2011 | Takasugi et al. |
| 2011/0072492 A1 | 3/2011 | Mohler et al. |
| 2011/0078081 A1 | 3/2011 | Pirzadeh et al. |
| 2011/0082711 A1 | 4/2011 | Poeze et al. |
| 2011/0107426 A1 | 5/2011 | Yen et al. |
| 2011/0112968 A1 | 5/2011 | Floreck et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145926 A1 | 6/2011 | Dalcher et al. |
| 2011/0154032 A1 | 6/2011 | Mauro, II |
| 2011/0161149 A1 | 6/2011 | Kaplan |
| 2011/0161484 A1 | 6/2011 | Van den Bogaert et al. |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0210933 A1 | 9/2011 | Forstall |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238496 A1 | 9/2011 | Gurbuxani et al. |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258462 A1 | 10/2011 | Robertson et al. |
| 2011/0276677 A1 | 11/2011 | Osuga et al. |
| 2011/0281558 A1 | 11/2011 | Winter |
| 2011/0294418 A1 | 12/2011 | Chen |
| 2011/0295980 A1 | 12/2011 | Aldis et al. |
| 2011/0314389 A1 | 12/2011 | Meredith et al. |
| 2012/0003983 A1 | 1/2012 | Sherlock et al. |
| 2012/0011572 A1 | 1/2012 | Chew et al. |
| 2012/0016735 A1 | 1/2012 | Park et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0102428 A1 | 4/2012 | Stewart |
| 2012/0102547 A1 | 4/2012 | Fransdonk |
| 2012/0115433 A1 | 5/2012 | Young et al. |
| 2012/0117478 A1 | 5/2012 | Vadde et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1* | 5/2012 | Bosch et al. ....................... 713/2 |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0155292 A1 | 6/2012 | Zazula et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0074067 A1 | 3/2013 | Chowdhry |
| 2013/0086385 A1 | 4/2013 | Poeluev |
| 2013/0086684 A1 | 4/2013 | Mohler |
| 2013/0097302 A9 | 4/2013 | Khedouri et al. |
| 2013/0097654 A1 | 4/2013 | Aciicmez et al. |
| 2013/0097657 A1 | 4/2013 | Cardamore et al. |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |

(56) References Cited

U.S. PATENT DOCUMENTS

| | | |
|---|---|---|
| 2013/0262264 A1 | 10/2013 | Karstoft |
| 2013/0263212 A1 | 10/2013 | Faltyn et al. |
| 2013/0275915 A1 | 10/2013 | Wang |
| 2013/0290709 A1 | 10/2013 | Muppidi et al. |
| 2013/0305333 A1 | 11/2013 | Katzer et al. |
| 2013/0310003 A1 | 11/2013 | Sadhvani et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0033316 A1 | 1/2014 | Paczkowski et al. |
| 2014/0036697 A1 | 2/2014 | Annan et al. |
| 2014/0047559 A1 | 2/2014 | Vera et al. |
| 2014/0059642 A1 | 2/2014 | Deasy et al. |
| 2014/0074508 A1 | 3/2014 | Ying et al. |
| 2014/0089243 A1 | 3/2014 | Oppenheimer |
| 2014/0089699 A1 | 3/2014 | O'Connor et al. |
| 2014/0104287 A1 | 4/2014 | Nalluri et al. |
| 2014/0106709 A1 | 4/2014 | Palamara et al. |
| 2014/0127662 A1 | 5/2014 | Kron et al. |
| 2014/0141718 A1 | 5/2014 | Stromberg et al. |
| 2014/0155025 A1 | 6/2014 | Parker et al. |
| 2014/0173462 A1 | 6/2014 | Mattingly et al. |
| 2014/0173747 A1 | 6/2014 | Govindaraju |
| 2014/0188738 A1 | 7/2014 | Huxham |
| 2014/0215196 A1 | 7/2014 | Berlin |
| 2014/0245444 A1 | 8/2014 | Lutas et al. |
| 2014/0254381 A1 | 9/2014 | Racz et al. |
| 2014/0267332 A1 | 9/2014 | Chhabra et al. |
| 2014/0279558 A1 | 9/2014 | Kadi et al. |
| 2014/0281544 A1 | 9/2014 | Paczkowski et al. |
| 2014/0298026 A1 | 10/2014 | Isozaki et al. |
| 2015/0106805 A1 | 4/2015 | Melander et al. |
| 2015/0169885 A1 | 6/2015 | Paczkowski et al. |
| 2015/0172928 A1 | 6/2015 | Katzer et al. |

FOREIGN PATENT DOCUMENTS

| | | | |
|---|---|---|---|
| WO | WO2012064171 A1 | 5/2012 | |
| WO | 2013170228 A2 | 11/2013 | |
| WO | 2014004590 A2 | 1/2014 | |
| WO | 2014018575 A2 | 1/2014 | |
| WO | 2014022446 A1 | 2/2014 | |
| WO | 2014025687 A2 | 2/2014 | |
| WO | WO2014158431 A1 | 10/2014 | |

OTHER PUBLICATIONS

Hollister, Sean, "Apple patent app hints at iPod-based phones, Peel 520 turns shades of green, red, blue and yellow," Engadget, http://www.engadget.com/2010/09/19/apple-patent-app-hints-at-ipod-based-phones-peel-520-turns-shad/, Sep. 19, 2010, p. 1.
Kenja's Newsletter, About Newsletter, http://kenja.net/news.main.html, printed from the World Wide Web, "last modified Fri, Oct. 10, 2003".
Openwave, "Comparison of WAP Push and Short Message Service (SMS)," Openwave Systems, Inc., Redwood City, CA, Apr. 2002.
Qualcomm, uiOne™, http://brew.qualcomm.com/brew/in/about/uione.html.
Scansoft press release, "Scansoft Launches SpeechPAK Healthcare Suite 2.0", http://dragontranscription.com/press-releases-articles-february-2005/scansoft-launches-speechpak-healthcare-suite-2.0.html, Feb. 17, 2005.
Stanford Technology Ventures Program, "Danger, Inc.: Powering the Next Generation of Mobile Technology", Oct. 15, 2003.
Pre-Interview Communication dated Apr. 24, 2012, U.S. Appl. No. 12/876,220, filed Sep. 6, 2010.
Pre-Interview Communication dated Feb. 26, 2013, U.S. Appl. No. 13/023,486, filed Feb. 8, 2011.
Notice of Allowance dated Jun. 4, 2013, U.S. Appl. No. 13/023,486, filed Feb. 8, 2011.
Office Action—Restriction Requirement dated Feb. 1, 2012, U.S. Appl. No. 12/876,221, filed Sep. 6, 2010.
Office Action dated May 10, 2012, U.S. Appl. No. 12/876,221, filed Sep. 6, 2010.
Final Office Action dated Jan. 11, 2013, U.S. Appl. No. 12/876,221, filed Sep. 6, 2010.
Advisory Action dated Apr. 23, 2013, U.S. Appl. No. 12/876,221, filed Sep. 6, 2010.
Notice of Allowance dated Jul. 2, 2013, U.S. Appl. No. 12/876,221, filed Sep. 6, 2010.
Pre-Interview Communication dated Jul. 19, 2012, U.S. Appl. No. 13/018,083, filed Jan. 31, 2011.
Pre-Interview Communication dated Feb. 26, 2013, U.S. Appl. No. 13/118,058, filed May 27, 2011.
Notice of Allowance dated Mar. 30, 2012, U.S. Appl. No. 13/029,103, filed Feb. 16, 2011.
Notice of Allowance dated Apr. 29, 2013, U.S. Appl. No. 13/537,563, filed Jun. 29, 2012.
Office Action dated Mar. 14, 2013, U.S. Appl. No. 13/161,496, filed Jun. 16, 2011.
Notice of Allowance dated Jun. 27, 2013, U.S. Appl. No. 13/161,496, filed Jun. 16, 2011.
Office Action dated Apr. 15, 2008, U.S. Appl. No. 11/046,083, filed Jan. 28, 2005.
Final Office Action dated Oct. 28, 2008, U.S. Appl. No. 11/046,083, filed Jan. 28, 2005.
Office Action dated Aug. 15, 2011, U.S. Appl. No. 12/330,759, filed Dec. 9, 2008.
Office Action dated Apr. 3, 2008, U.S. Appl. No. 11/333,964, filed Jan. 17, 2006.
Final Office Action dated Oct. 8, 2008, U.S. Appl. No. 11/333,964, filed Jan. 17, 2006.
Final Office Action dated Jan. 21, 2009, U.S. Appl. No. 11/333,964, filed Jan. 17, 2006.
Advisory Action dated Apr. 13, 2009, U.S. Appl. No. 11/333,964, filed Jan. 17, 2006.
Office Action dated Jun. 23, 2009, U.S. Appl. No. 11/333,964, filed Jan. 17, 2006.
Final Office Action dated May 11, 2010, U.S. Appl. No. 11/333,964, filed Jan. 17, 2006.
Advisory Action dated Jul. 22, 2010, U.S. Appl. No. 11/333,964, filed Jan. 17, 2006.
Wolter, Eric, Patent Application entitled "Method and System for Calendar-Based Delivery of Themed User-Interface Skins," filed Dec. 9, 2008, U.S. Appl. No. 12/330,759.
Wolter, Eric S., Patent Application entitled "Method and System for Delivery of User-Interface Skins, Applications, and Services to Wireless Devices," filed Jan. 17, 2006, U.S. Appl. No. 11/333,964.
Delker, Jason R., et al., Patent Application entitled "Provisioning System and Methods for Interfaceless Phone," filed Sep. 6, 2010, U.S. Appl. No. 12/876,220.
Delker, Jason R., et al., Patent Application entitled "System and Method for ID Platform," filed Feb. 8, 2011, U.S. Appl. No. 13/023,486.
Delker, Jason R., et al., Patent Application entitled "Dynamic Loading, Unloading, and Caching of Alternate Complete Interfaces," filed Sep. 6, 2010, U.S. Appl. No. 12/876,221.
Delker, Jason R., et al., Patent Application entitled "Shared ID with Second Party," filed Jan. 31, 2011, U.S. Appl. No. 13/018,083.
Delker, Jason R., et al., Patent Application entitled "Extending ID to a Computer System," filed May 27, 2011, U.S. Appl. No. 13/118,058.
Davis, John M., et al., Patent Application entitled "Mirroring Device Interface Components for Content Sharing," filed Mar. 10, 2011, U.S. Appl. No. 13/045,292.
Annan, Brandon C., et al., Patent Application entitled, "Traffic Management of Third Party Applications", filed Jul. 31, 2012, U.S. Appl. No. 13/536,709.
Cha, Tae-Woo, et al., Patent Application entitled "Device Experience Adaptation Based on Schedules and Events," filed Feb. 16, 2011, U.S. Appl. No. 13/029,103.

(56) References Cited

OTHER PUBLICATIONS

Cha, Tae-Woo, et al., Patent Application entitled "Device Experience Adaptation Based on Schedules and Events," filed Jun. 29, 2012, U.S. Appl. No. 13/537,563.
Smith, Nathan A., et al., Patent Application entitled "Restricted Testing Access for Electronic Device," filed Jun. 16, 2011, U.S. Appl. No. 13/161,496.
Katzer, Robin Dale, et al., Patent Application entitled "Zone Architecture for Dynamic Targeted Content Creation," filed Oct. 11, 2011, U.S. Appl. No. 13/271,207.
Delker, Jason R., et al., Patent Application entitled "Transition Experience During Loading and Updating an Interface and Applications Pack," filed Oct. 24, 2012, U.S. Appl. No. 13/659,889.
Delker, Jason R., et al., Patent Application entitled "Ad Sponsored Communication Pack," filed Feb. 18, 2011, U.S. Appl. No. 13/031,123.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Cope, Warren B., et al., "Electronic Purchase Transaction Trust Infrastructure", filed May 29, 2012, U.S. Appl. No. 13/482,731.
Cope, Warren B., et al., "Alternative hardware and Software Configuration for Near Field Communication", filed May 4, 2012, U.S. Appl. No. 13/463,797.
Cope, Warren B., et al., "Multiple Secure Elements in Mobile Electronic Device with Near Field Communication Capability", filed Apr. 5, 2012, U.S. Appl. No. 13/440,980.
Bye, Stephen James, et al., "Near Field Communication Authentication and Validation to Access Corporate Data", filed May 3, 2012, U.S. Appl. No. 13/463,801.
Katzer, Robin D., et al., "Web Server Bypass of Backend Process on Near Field Communications and Secure Elements Chips", filed May 11, 2012, U.S. Appl. No. 13/470,203.
Katzer, Robin D., et al., "Web Server Bypass of Backend Process on Near Field Communications and Secure Elements Chips", filed May 10, 2013, PCT Application No. PCT/US13/40673.
Katzer, Robin D., et al., "Secure Placement of Centralized Media Controller Application in Mobile Access Terminal", filed Nov. 11, 2011, U.S. Appl. No. 13/294,177.
McRoberts, Leo Michael, et al., "End-to-End Trusted Communications Infrastructure", filed Jun. 25, 2012, U.S. Appl. No. 13/532,588.
McRoberts, Leo Michael, et al., "End-to-End Trusted Communications Infrastructure", filed on Jun. 25, 2013, PCT Serial No. PCT/US13/47729.
Paczkowski, Lyle W., et al., "Trusted Policy and Charging Enforcement Function", filed Jun. 27, 2012, U.S. Appl. No. 13/533,969.
Bye, Stephen James, et al., "Systems and Methods for Provisioning and Using Multiple Trusted Security Zones on an Electronic Device", filed on Aug. 5, 2013, PCT Serial No. PCT/US13/53617.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Jul. 2, 2012, U.S. Appl. No. 13/540,437.
Katzer, Robin D., et al., "Trusted Access to Third Party Applications Systems and Methods", filed Jul. 25, 2012, U.S. Appl. No. 13/557,213.
Paczkowski, Lyle W., et al., "System and Methods for Trusted Internet Domain Networking", filed Sep. 11, 2012, U.S. Appl. No. 13/610,856.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Verifying Applications Using a Trusted Security Zone", filed Aug. 12, 2013, U.S. Appl. No. 13/964,112.
Paczkowski, Lyle W., et al., "Mobile Access Terminal with Local Call Session Control Function", filed Jun. 18, 2009, U.S. Appl. No. 12/486,873.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Foreign Communication From a Related Counterpart Application—International Search Report and Written Opinion, PCT/US2013/052805 Oct. 4, 2013.
FAIPP Office Action dated Jan. 24, 2014, U.S. Appl. No. 12/876,220, filed Sep. 6, 2010.
Final Office Action dated May 10, 2013, U.S. Appl. No. 13/018,083, filed Jan. 31, 2011.

(56) References Cited

OTHER PUBLICATIONS

Advisory Action dated Aug. 6, 2013, U.S. Appl. No. 13/018,083, filed Jan. 31, 2011.
Office Action dated Dec. 26, 2013, U.S. Appl. No. 13/018,083, filed Jan. 31, 2011.
First Action Interview Office Action dated May 6, 2013, U.S. Appl. No. 13/118,058, filed May 27, 2011.
Final Office Action dated Sep. 10, 2013, U.S. Appl. No. 13/118,058, filed May 27, 2011.
Advisory Action dated Nov. 22, 2013, U.S. Appl. No. 13/118,058, filed May 27, 2011.
Office Action—Restriction Requirement dated Aug. 26, 2013, U.S. Appl. No. 13/031,123, filed Feb. 18, 2011.
Office Action dated Dec. 17, 2013, U.S. Appl. No. 13/031,123, filed Feb. 18, 2011.
Delker, Jason R., et al., Patent Application entitled "System and Method for ID Platform," filed Sep. 5, 2013, U.S. Appl. No. 14/019,053.
Delker, Jason R., et al., Patent Application entitled "Dynamic Loading, Unloading, and Caching of Alternate Complete Interfaces," filed Sep. 30, 2013, U.S. Appl. No. 14/042,707.
Annan, Brandon C., et al., International Application entitled, "Traffic Management of Third Party Applications", filed Jul. 24, 2013, Serial No. PCT/US13/52805.
Notice of Allowance dated Nov. 29, 2013, U.S. Appl. No. 13/440,980, filed Apr. 5, 2012.
Office Action dated Dec. 19, 2013, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
Cope, Warren B., et al., "Extended Trusted Security Zone Radio Modem", filed Nov. 26, 2013, U.S. Appl. No. 14/090,667.
Paczkowski, Lyle W., et al., "Trusted Security Zone Containers for the Protection and Confidentiality of Trusted Service Manager Data", filed Feb. 16, 2014, PCT Application No. PCT/US14/16651.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.
Final Office Action dated Sep. 9, 2013, U.S. Appl. No. 13/440,980, filed Apr. 5, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Notice of Allowance dated Oct. 16, 2013, U.S. Appl. No. 13/556,200, filed Jul. 24, 2012.
FAIPP Pre-Interview Communication dated Mar. 20, 2014, U.S. Appl. No. 13/482,731, filed May 29, 2012.
Final Office Action dated Mar. 27, 2014, U.S. Appl. No. 13/470,203, filed May 11, 2012.
Notice of Allowance dated Jan. 28, 2014, U.S. Appl. No. 12/486,873, filed Jun. 18, 2009.
Paczkowski, Lyle W., et al., "Trusted Security Zone Access to Peripheral Devices", filed Jan. 6, 2014, U.S. Appl. No. 14/148,714.
Final Office Action dated Mar. 20, 2014, U.S. Appl. No. 12/876,220, filed Sep. 6, 2010.
Notice of Allowance dated May 6, 2014, U.S. Appl. No. 12/876,220, filed Sep. 6, 2010.
Pre-Interview Communication dated Mar. 28, 2014, U.S. Appl. No. 14/019,053, filed Sep. 5, 2013.
Final Office Action dated Apr. 3, 2014, U.S. Appl. No. 13/018,083, filed Jan. 31, 2011.
Advisory Action dated Jun. 9, 2014, U.S. Appl. No. 13/018,083, filed Jan. 31, 2011.
Office Action dated Mar. 18, 2014, U.S. Appl. No. 13/118,058, filed May 27, 2011.
Pre-Interview Communication dated Jun. 9, 2014, U.S. Appl. No. 13/271,207, filed Oct. 11, 2011.
Pre-Interview Communication dated Mar. 21, 2014, U.S. Appl. No. 13/537,610, filed Jun. 29, 2012.
Notice of Allowance dated May 18, 2014, U.S. Appl. No. 13/537,610, filed Jun. 29, 2012.
Notice of Allowance dated Jun. 4, 2014, U.S. Appl. No. 13/557,213, filed Jul. 25, 2012.
FAIPP Pre-Interview Communication dated Aug. 4, 2014, U.S. Appl. No. 13/844,357, filed Mar. 15, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Ahmed, Farid, et al., "Correlation-based Watermarking Method for Imagine Authentication Applications", Society of Photo-Optical Instrumentation Engineers, Feb. 17, 2004, pp. 1834-1838.
Foreign Communication from a Related Counterpart—International Search Report and Written Opinion, dated Jul. 11, 2014, PCT/US14/16651, filed on Feb. 16, 2014.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Bertz, Lyle T., et al., "Framework for Real-Time Brokering of Digital Content Delivery," filed Aug. 25, 2012, U.S. Appl. No. 13/594,777.
Bertz, Lyle T., et al.,"Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.
Paczkowski, Lyle W., et al., "Trusted Processing Location Within a Graphics Processing Unit", filed Jul. 10, 2013, U.S. Appl. No. 13/939,175.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed Apr. 4, 2013, U.S. Appl. No. 13/857,141.

(56) References Cited

OTHER PUBLICATIONS

Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
Notice of Allowance dated May 27, 2014, U.S. Appl. No. 13/482,731, filed May 29, 2012.
Advisory Action dated May 29, 2014, U.S. Appl. No. 13/470,203, filed May 11, 2012.
FAIPP Pre-Interview Communication dated May 12, U.S. Appl. No. 13/294,177, filed Nov. 11, 2011.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Foreign Communication from a Related Counterpart—International Search Report and Written Opinion, dated Apr. 22, 2014, PCT/US13/53617, filed on Aug. 5, 2013.
Office Action dated Aug. 29, 2014, U.S. Appl. No. 13/470,203, filed May 11, 2012.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Foreign Communication from a Related Counterpart—International Preliminary Report on Patentability, dated Nov. 20, 2014, PCT/US13/40673, filed on May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber=1617569.
Notice of Allowance dated Aug. 13, 2014, U.S. Appl. No. 14/019,053, filed Sep. 5, 2013.
Office Action dated Sep. 23, 2014, U.S. Appl. No. 13/018,083, filed Jan. 31, 2011.
Notice of Allowance dated Oct. 22, 2014, U.S. Appl. No. 13/118,058, filed May 27, 2011.
Pre-Interview Communication dated Aug. 6, 2014, U.S. Appl. No. 13/045,292, filed Mar. 10, 2011.
First Action Interview Office Action dated Oct. 10, 2014, U.S. Appl. No. 13/045,292, filed Mar. 10, 2011.
Pre-Interview Communication dated Aug. 8, 2014, U.S. Appl. No. 13/659,889, filed Oct. 24, 2012.
First Action Interview dated Oct. 15, 2014, U.S. Appl. No. 13/659,889, filed Oct. 24, 2012.
Office Action dated Oct. 10, 2014, U.S. Appl. No. 13/031,123, filed Feb. 18, 2011.
Wick, Ryan A., et al., Patent Application entitled "Mobile Phone Controls Preprocessor" filed Sep. 3, 2014, U.S. Appl. No. 14/476,339.
FAIPP Pre-Interview Communication dated Mar. 25, 2015, U.S. Appl. No. 13/532,588, filed Jun. 25, 2012.
FAIPP Pre-Interview Communication dated Mar. 10, 2015, U.S. Appl. No. 13/762,319, filed Feb. 7, 2013.
FAIPP Pre-Interview Communication dated May 21, 2015, U.S. Appl. No. 14/090,667, filed Nov. 26, 2013.
Final Office Action dated Apr. 7, 2015, U.S. Appl. No. 13/844,145, filed Mar. 15, 2013.
First Action Interview Office Action dated Apr. 7, 2015, U.S. Appl. No. 13/802,404, filed Mar. 13, 2013.
FAIPP Pre-Interview Communication dated Mar. 26, 2015, U.S. Appl. No. 13/939,175, filed Jul. 10, 2013.
Final Office Action dated Mar. 24, 2015, U.S. Appl. No. 13/844,282, filed Mar. 15, 2013.
FAIPP Pre-Interview Communication dated Mar. 24, 2015, U.S. Appl. No. 13/964,112, filed Aug. 12, 2013.
FAIPP Pre-Interview Communication dated Apr. 15, 2015, U.S. Appl. No. 14/085,474, filed Nov. 20, 2013.
First Action Interview Office Action dated Apr. 10, 2015, U.S. Appl. No. 14/075,663, filed Nov. 8, 2013.
Notice of Allowance dated Apr. 9, 2015, U.S. Appl. No. 14/163,047, filed Jan. 24, 2014.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Bertz, Lyle T., et al., "Framework for Real-Time Brokering of Digital Content Delivery," filed Mar. 17, 2015, U.S. Appl. No. 14/659,614.
Marquard, et al., "Infrastructure for Secure Short Message Transmission," filed Apr. 7, 2015, U.S. Appl. No. 14/681,077.
Final Office Action dated May 18, 2015, U.S. Appl. No. 13/659,889, filed Oct. 24, 2012.
Notice of Allowance dated Apr. 22, 2015, U.S. Appl. No. 13/031,123, filed Feb. 18, 2011.
Schwermann, Nathan M., et al., entitled "Methods for Customization of Default Applications on a Mobile Communication Device," filed Apr. 30, 2015, U.S. Appl. No. 14/701,156.
Notice of Allowance dated May 29, 2015, U.S. Appl. No. 14/085,474, filed Nov. 20, 2013.
Notice of Allowance dated Dec. 22, 2014, U.S. Appl. No. 13/470,203, filed May 11, 2012.
Notice of Allowance dated Feb. 5, 2015, U.S. Appl. No. 13/533,969, filed Jun. 27, 2012.
Restriction Requirement dated Jan. 2, 2015, U.S. Appl. No. 13/762,319, filed Feb. 7, 2013.
FAIPP Pre-Interview Communication dated Feb. 12, 2015, U.S. Appl. No. 14/066,661, filed Oct. 29, 2013.
Notice of Allowance dated Dec. 3, 2014, U.S. Appl. No. 13/594,777, filed Aug. 25, 2012.
First Action Interview Office Action dated Dec. 3, 2014, U.S. Appl. No. 13/594,779, filed Aug. 25, 2012.
Notice of Allowance dated Feb. 26, 2015, U.S. Appl. No. 13/786,450, filed Mar. 5, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
FAIPP Pre-Interview Communication dated Feb. 4, 2015, U.S. Appl. No. 14/075,663, filed Nov. 8, 2013.
FAIPP Pre-Interview Communication dated Feb. 25, 2015, U.S. Appl. No. 14/163,047, filed Jan. 24, 2014.

(56) References Cited

OTHER PUBLICATIONS

Restriction Requirement dated Jan. 5, 2015, U.S. Appl. No. 13/857,139, filed Apr. 4, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Preliminary Report on Patentability, dated Feb. 5, 2015, PCT/US13/51750, filed on Jul. 24, 2013.
Katzer, Robin D., et al., "Web Server Bypass of Backend Process on Near Field Communications and Secure Elements Chips", filed Feb. 26, 2015, U.S. Appl. No. 14/632,850.
Neson, Tracy L., et al., "Mated Universal Serial Bus (USB) Wireless Dongles Configured with Destination Addresses", filed Jan. 26, 2015, U.S. Appl. No. 14/606,011.
Paczkowski, Lyle W., et al., "Trusted Code Generation and Verification to Prevent Fraud from Maleficent External Devices that Capture Data", filed Jan. 14, 2015, U.S. Appl. No. 14/592,218.
Foreign Communication From a Related Counterpart Application—International Preliminary Report on Patentability dated Feb. 12, 2015, PCT/US2013/052805 filed on Jul. 24, 2013.
Supplemental Notice of Allowance dated Dec. 3, 2014, U.S. Appl. No. 13/118,058, filed May 27, 2011.
Notice of Allowance dated Jan. 6, 2015, U.S. Appl. No. 13/045,292, filed Mar. 10, 2011.
Office Action dated Dec. 17, 2014, U.S. Appl. No. 13/563,709, filed Jul. 31, 2012.
FAIPP Office Action dated Dec. 2, 2014, U.S. Appl. No. 13/271,207, filed Oct. 11, 2011.
FAIPP Pre-Interview Communication dated Jul. 2, 2015, U.S. Appl. No. 14/632,850, filed Feb. 26, 2015.
Notice of Allowance dated Jun. 9, 2015, U.S. Appl. No. 13/762,319, filed Feb. 7, 2013.
Notice of Allowance dated Aug. 4, 2015, U.S. Appl. No. 14/090,667, filed Nov. 26, 2013.
Notice of Allowance dated Jul. 6, 2015, U.S. Appl. No. 13/844,145, filed Mar. 15, 2013.
Notice of Allowance dated Jul. 6, 2015, U.S. Appl. No. 14/066,661, filed Oct. 29, 2013.
Notice of Allowance dated Aug. 14, 2015, U.S. Appl. No. 13/594,779, filed Aug. 25, 2012.
Final Office Action dated Aug. 27, 2015, U.S. Appl. No. 13/802,404, filed Mar. 13, 2013.
Notice of Allowance dated Jul. 7, 2015, U.S. Appl. No. 13/939,175, filed Jul. 10, 2013.
Advisory Action dated Jun. 10, 2015, U.S. Appl. No. 13/844,282, filed Mar. 15, 2013.
Office Action dated Aug. 24, 2015, U.S. Appl. No. 13/844,282, filed Mar. 15, 2013.
Notice of Allowance dated Aug. 3, 2015, U.S. Appl. No. 13/964,112, filed Aug. 12, 2013.
Notice of Allowance dated Jul. 1, 2015, U.S. Appl. No. 14/075,663, filed Nov. 8, 2013.
Notice of Allowance dated Jul. 22, 2015, U.S. Appl. No. 14/229,532, filed Mar. 28, 2014.
Notice of Allowance dated Aug., 28, 2015, U.S. Appl. No. 14/446,330, filed Jul. 29, 2014.
FAIPP Pre-Interview Communication dated Aug. 5, 2015, U.S. Appl. No. 13/857,141, filed Apr. 4, 2013.
FAIPP Pre-Interview Communication dated Jun. 2, 2015, U.S. Appl. No. 13/857,139 filed Apr. 4, 2013.
Notice of Allowance dated Jun. 11, 2015, U.S. Appl. No. 13/857,138, filed Apr. 4, 2013.
Henderson, Tristan, et al., "On the Wire, Congestion Pricing: Paying Your Way in Communications Networks," University College London, Sep./Oct. 2001, retrieved from: http://tristan.host.cs.st-andrews.ac.uk!research/pubs/ieeeic01.pdf.
Final Office Action dated Jun. 23, 2015, U.S. Appl. No. 13/563,709, filed Jul. 31, 2012.
Final Office Action dated Jun. 4, 2015, U.S. Appl. No. 13/271,207, filed Oct. 11, 2011.
Pre-Interview Communication dated Jun. 8, 2015, U.S. Appl. No. 14/476,339, filed Sep. 3, 2014.
Notice of Allowance dated Jul. 16, 2015, U.S. Appl. No. 14/476,339, filed Sep. 3, 2014.
Advisory Action dated Jul. 27, 2015, U.S. Appl. No. 13/659,889, filed Oct. 24, 2012.

\* cited by examiner

SYSTEMS AND METHODS FOR PROVISIONING AND USING MULTIPLE TRUSTED SECURITY ZONES ON AN ELECTRONIC DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices in the future are expected to store or embody a variety of applications that may interact with confidential information such as credit card numbers, bank account numbers, authentication numbers, personal data, medical information, and the like. Additionally, mobile communication devices may promote users installing after market applications that may be infiltrated by malware such as viruses, Trojans, screen scrapers, keyboard monitors, and other nefarious software and/or firmware.

SUMMARY

In an embodiment, a method of executing independent trusted applications in a processor having a plurality of trusted security zones is disclosed. The method comprises, invoking a first trusted application to execute in a first subordinate trusted security zone of the processor, wherein the first trusted application is invoked by a master trusted application executing in a master trusted security zone of the processor and wherein the master trusted application has no visibility into a first memory space associated with the first subordinate trusted security zone and no visibility into the processing of the first trusted application. The method further comprises invoking a second trusted application to execute in a second subordinate trusted security zone of the processor, wherein the second trusted application is invoked by the master trusted application executing in the master trusted security zone of the processor and wherein the master trusted application has no visibility into a second memory space associated with the second subordinate trusted security zone and no visibility into the processing of the second trusted application, wherein the master trusted security application mediates access to the first trusted security zone and to the second trusted security zone.

In an embodiment, a method of provisioning a subordinate trusted security zone in a processor having a trusted security zone is disclosed. The method comprises receiving by a master trusted application executing in a master trusted security zone of the processor a request to provision a subordinate trusted security zone in the processor, wherein the request comprises a master trusted security zone key, wherein the request designates the subordinate trusted security zone, and wherein the request defines an independent key. The method further comprises provisioning by the master trusted application the subordinate trusted security zone to be accessible based on the independent key.

In an embodiment, a method of changing the memory size of a subordinate trusted security zone in a processor having a trusted security zone is disclosed. The method comprises transmitting an indication of memory utilized by a first subordinate trusted security zone of the processor to a master trusted application executing in a master trusted security zone of the processor, and receiving by the master trusted application a request to increase the memory size of a second subordinate trusted security zone of the processor. The method further comprises reducing the memory size of the first subordinate trusted security zone based at least in part on the indication of memory utilized by the first subordinate trusted security zone and increasing the memory size of the second subordinate trusted security zone.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
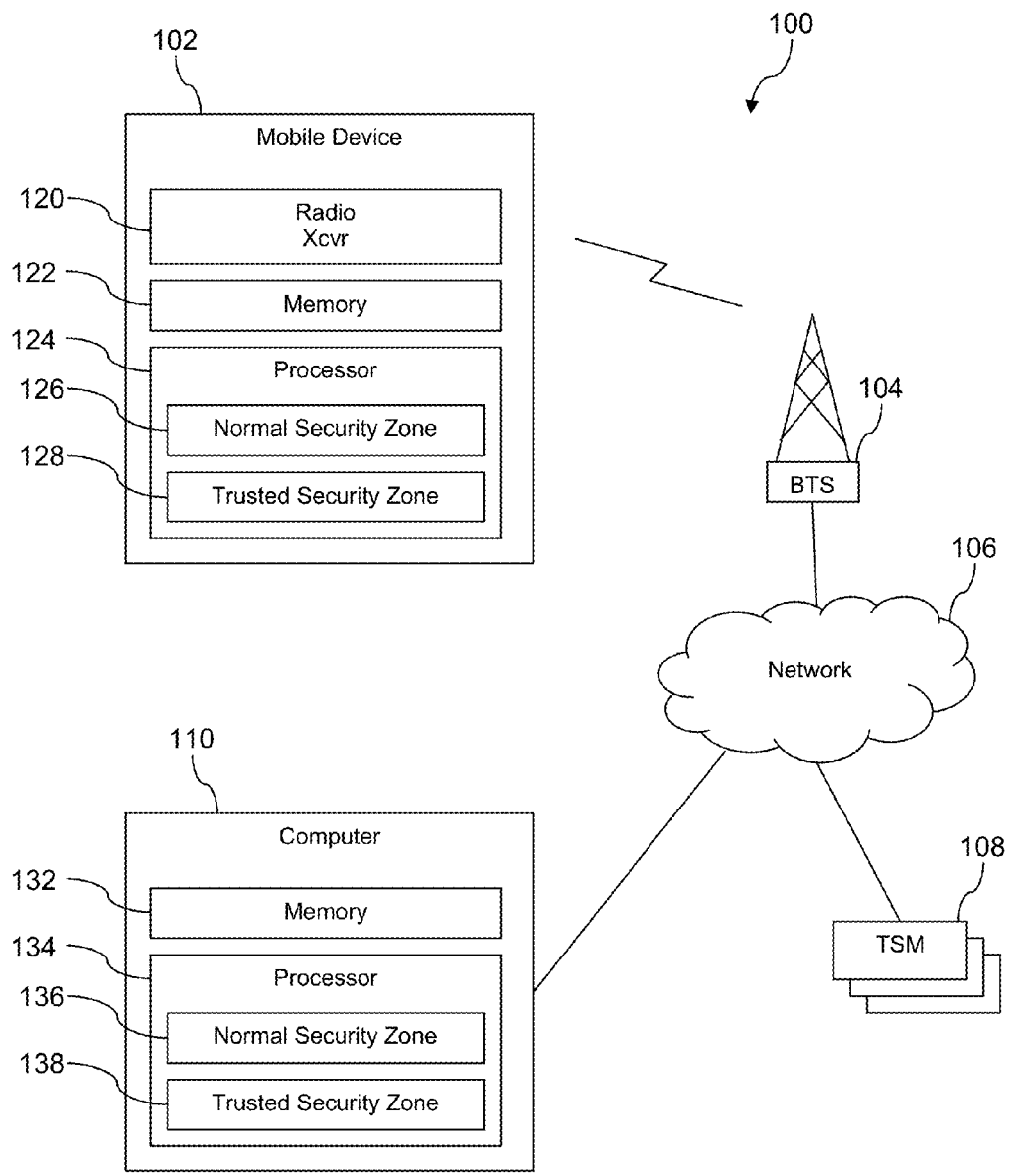
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A computing device or electronic device having a trusted security zone that comprises a master trusted security zone and a plurality of subordinate trusted security zones is described. The computing device can be a mobile device such as a mobile phone, a personal digital assistant, a media player, or other. The computing device may be a desktop computer, a laptop computer, a notebook computer, or other computer. The computing device may be coupled to a network by a wireless link and/or by a wired link.

A computing device may be manufactured by an original equipment manufacturer with a processor having a normal security zone and a trusted security zone. The manufacture may provide the trusted security zone with a master trusted security zone, with a master trusted application associated with the master trusted security zone, and with a master key associated with the master trusted security zone. Additionally, the trusted security zone may have a plurality of statically configured subordinate trusted security zones that are initially not provisioned with an independent key for accessing the subordinate trusted security zone. Alternatively, the trusted security zone may be configured to promote the master trusted security zone dynamically generating subordinate trusted security zones in response to a provisioning session initiated by an external device, for example by a trusted service manager server associated with a credit card account.

The master trusted security zone may execute a master trusted application that performs a variety of functions for provisioning and mediating between the plurality of subordinate trusted security zones. When a request to provision a subordinate trusted security zone is received by the master trusted application and the request contains or is accompanied by a master key, the master trusted application may provision a subordinate trusted security zone and make it accessible to another device that is executing in a trusted security zone on that device. Then the device may send commands to install a trusted application on the computing device for execution in the subordinate trusted security zone, for example providing both the independent key associated with the subordinate trusted security zone and the code implementing the trusted application.

The master trusted application may mediate the access to the subordinate trusted security zone without actually accessing or monitoring the subordinate trusted security zone or the memory associated with the subordinate trusted security zone. When the trusted application executes in the subordinate trusted security zone, likewise, the master trusted application does not have visibility into either the subordinate trusted security zone or into the memory associated with the subordinate trusted security zone.

Over time, the resource needs of different trusted applications associated with different subordinate trusted security zones may change. The master trusted application may be able to reallocate trusted security zone resources among the subordinate trusted security zones based on analysis of historical resource usage reports provided by the subordinate trusted security zones. For example, the master trusted application may take resources away from a subordinate trusted security zone that historically uses only about 35% of its resources and reallocate them to a different subordinate trusted security zone that has requested an increase in dedicated resources. A variety of different algorithms for assessing the utilization of subordinate trusted security zones and for reallocating these resources are disclosed further below.

The different subordinate trusted security zones may be associated with different credit card accounts, different banking accounts, and different interface and application packs. For example, one subordinate trusted security zone may be associated with an interface and application pack that is approved by an enterprise that employs the user of the computing device. Another subordinate trusted security zone may be associated with an interface and application pack that is associated with the private user of the computing device, rather than as an employee of the enterprise. One subordinate trusted security zone may execute the enterprise interface and application pack while the user is at work or during working hours, and the other subordinate trusted security zone may execute the private interface and application pack while the user is not at work or outside of working hours. As explained further below, when a trusted application executes in one subordinate trusted security zone, other subordinate trusted security zones are prevented from executing, thereby maintaining the security of the memory associated with the executing subordinate trusted security zone. In some contexts interface and application packs associated with different subordinate trusted security zones may be referred to as different personas of the computing device.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. Likewise, access to peripherals and/or to memory by trusted applications associated to subordinate trusted security zones that are not executing is also restricted while another trusted application associated with a different subordinate trusted security zone is executing. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a communication system 100 is described. In an embodiment, the system 100 comprises a mobile device 102, a base transceiver station (BTS) 104, a network 106, a trusted service manager server computer 108, and a computer 110. It is understood that the system 100 may comprise any number of mobile devices 102, any number of base transceiver stations 104, any number of trusted service manager servers 108, and any number of computers 110. The network 106 may comprise one or more public networks, one or more private networks, or a combination thereof.

The mobile device 102 comprises a radio transceiver 120, a memory 122, and a processor 124. The radio transceiver 120 is configured to establish a wireless communication link with the base transceiver station 104. The base transceiver station 104 may communicatively couple the radio transceiver 120 and/or the mobile device 102 to the network 106 and to devices that are connected to the network 106, for example the trusted service manager server 108. In an embodiment, the radio transceiver 120 and the base transceiver station 104 establish a wireless communication link according to one of a code division multiple access (CDMA) wireless protocol, a global system for mobile communication (GSM) wireless protocol, a long term evolution (LTE) wireless protocol, a worldwide interoperability for microwave access (WiMAX) wireless protocol, or another wireless communication protocol.

The processor 124 comprises a normal security zone 126 and a trusted security zone 128. Under some circumstances, the processor 124 may periodically or occasionally switch between execution in the normal security zone 126 and execution in the trusted security zone 128 to check for any pending operations. For example, when executing in the trusted security zone 128, the processor 124 may pause execution in the trusted security zone 128, start execution in the normal security zone 126, and check if any tasks are pending attention in the normal security zone 126, for example receiving an email or an incoming text message. When the trusted security zone 128 is executing a sensitive operation the processor 124 may not switch to execute in the normal security zone 126 even if a periodic or scheduled switch interval occurs and may defer this switch until the sensitive operation being performed in the trusted security zone 128 is completed.

The processor 124 may be any of a microprocessor, a digital signal processor (DSP), an application specific integrated circuit (ASIC), a field programmable gate array (FPGA), a complex programmable logic device (CPLD), or another type of processor. The processor 124 may comprise a plurality of individual processor chips. The processor 124 may comprise a single chip that encapsulates a plurality of independent logic processing units or processors, for example a dual-core processor or a quad-core processor. As described above, when the trusted security zone executes an application, the normal security zone 126 is prevented from executing applications. The memory 122 may store both normal applications and trusted applications, where trusted applications are authorized for executing in the trusted security zone 128. Alternatively, the memory 122 may be segmented into a normal security portion and a trusted security portion, and the trusted applications may be stored in the trusted security portion of the memory 122.

The computer 110 may comprise a memory 132 and a processor 134. The processor 134 may comprise a normal security zone 136 and a trusted security zone 138. The memory 132, the processor 134, the normal security zone 136, and the trusted security zone 138 are substantially similar to the corresponding structures of the mobile device 102 and will not be described separately herein. The main difference between the mobile device 102 and the computer 110 as it pertains to this disclosure is that the mobile device 102 is communicatively coupled to the network 106 by a wireless link and the computer 110 may be communicatively coupled to the network 106 by a wired link. In an embodiment, however, the computer 110 may be communicatively coupled to the network 106 by a wireless link, such as by a wireless link to an access point in a wireless local access network (WLAN) that is part of the network 106.

Figure 2:
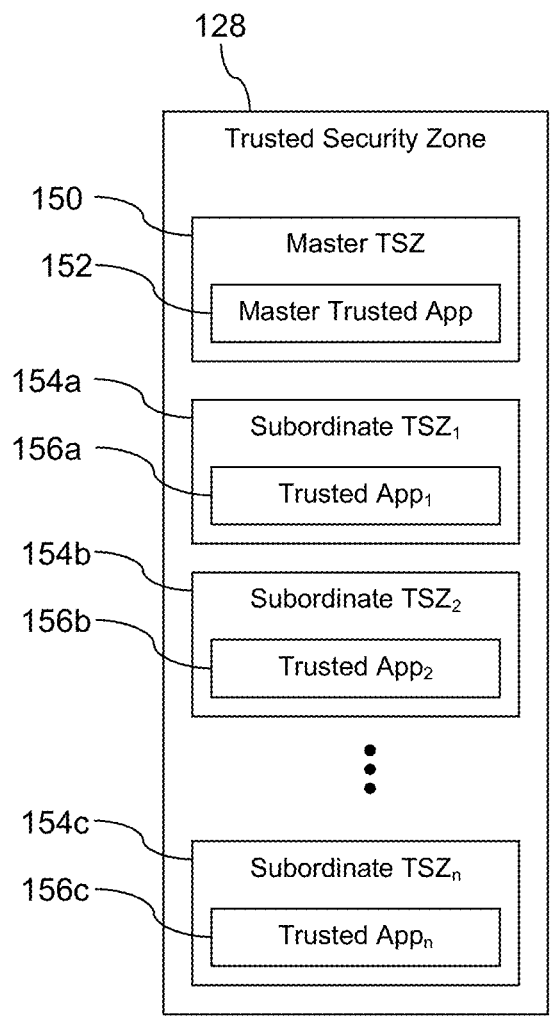
FIG. 2 is an illustration of a trusted security zone according to an embodiment of the disclosure.

Turning now to FIG. 2, further details of the trusted security zone 128 are described. It is to be understood that the structures and functions described with reference to the trusted security zone 128 of the mobile device 102 apply equally to the trusted security zone 138 of the computer 110. In an embodiment, the trusted security zone 128 comprises a master trusted security zone 150 that executes a master trusted application 152. In an embodiment, the master trusted security zone 150 may be associated with and/or execute a plurality of different master trusted applications 152.

The trusted security zone 128 may further comprise one or more subordinate trusted security zones 154, for example a first subordinate trusted security zone 154a, a second subordinate trusted security zone 154b, and a third subordinate trusted security zone 154c. The subordinate trusted security zones 154 may be created at the time of manufacturing of the processor 124 and may be fixed in number. Alternatively, the subordinate trusted security zones 154 may be dynamically created after manufacturing of the processor 124 and may vary in number. Each subordinate trusted security zone 154 may execute a trusted application 156. For example, the first subordinate trusted security zone 154a may execute a first trusted application 156a, the second subordinate trusted security zone 154b may execute a second trusted application 156b, and the third subordinate trusted security zone 154c may execute a third trusted application 156c. In an embodiment, the subordinate trusted security zones 154 may be associated with and/or execute a plurality of different trusted applications 156.

The master trusted application 152 may perform a variety of operations or functions associated with the subordinate trust zones 154. For example, the master trusted application 152 may schedule which of the subordinate trust zones 154 and/or trusted applications 156 may execute at a specific time, for how long, and may invoke or initiate execution of the trusted application 156. The master trusted application 152 may promote the initialization of the subordinate trust zones 154, the installation of trusted applications 156, and/or the dynamic allocation of space and/or resources in the trusted security zone 128 to the subordinate trust zones 154. While the master trusted application 152 and/or the master trusted security zone 150 exercises these supervisory, mediating, and/or promotional activities, it is to be understood that the master trusted application 152 and/or the master trusted security zone 150 has limited or no direct visibility into the processing of the trusted applications 156 by the subordinate trusted security zones 154 and/or into the data accessed by the subordinate trusted security zones 154.

In an embodiment, the trusted security zone 128 is manufactured by an original equipment manufacturer of processors 134, for example a semiconductor manufacturer, to have the master trusted security zone 150 and a fixed number of subordinate trusted security zones 154. The trusted security zone 128 may comprise 2 subordinate trusted security zones 154, 4 subordinate trusted security zones 154, 8 subordinate trusted security zones 154, 16 subordinate trusted security zones 154, or more subordinate trusted security zones 154. In an embodiment, the trusted security zone 128 may comprise an odd number of subordinate trusted security zones 154. The master trusted security zone 150 may be provisioned by the manufacturer with the master trusted application 152 and a master key that may be presented with requests for service by the master trusted application 152. Additionally, the subordinate trusted security zones 154 may be provisioned by the manufacturer with a base layer of trusted security functionality or utilities.

After the mobile device 102 is placed into service, a user may wish to provision a credit card into one of the subordinate trusted security zones 154, for example to provision a first credit card into the first subordinate trusted security zone 154a. A first trusted service manager server 108 may send a request to the master trusted application 152 to provision the first credit card into the first subordinate trusted security zone 154a, via the network 106, via the base transceiver station 104, and via the radio transceiver 120. Said in other words, the first trusted service manager server 108 may send the request via a radio communication link, and the mobile device 102 may receive the request via a radio communication link. The trusted service manager server 108 may perform the credit card provisioning while executing in a trusted security zone of the trusted service manager server 108 and may transmit the request over a trusted end-to-end communication link. For further details about establishing trusted end-to-end communication links, see U.S. patent application Ser. No. 13/532,588, filed Jun. 25, 2012, entitled "End-to-end Trusted Communications Infrastructure," by Leo Michael McRoberts, et al., which was incorporated by reference above.

The provisioning may be conducted in two steps. The first step may involve the trusted service manager server 108 providing the master key to the master trusted application 152. The master trusted application 152 may then provide access to the first subordinate trusted security zone 154a to the trusted service manager server 108. When the trusted service manager server 108 has gained access to the first subordinate trusted security zone 154a, the trusted service manager server 108 may initialize the first subordinate trusted security zone 154a with an individual key known to the trusted service manager server 108 and not known to the master trusted application 152 or to the master trusted security zone 150.

Then, in the second step of provisioning, the trusted service manager server 108 may send a request to the first trusted security zone 154a including the individual key, wherein the request further comprises the first trusted application 156a and possibly additional data or information for installation in the first trusted security zone 154a and/or in a portion of memory 122 allocated to the first trusted security zone 154a. One or more functions that are part of a base layer of trusted security functionality that may have been installed during original manufacturing of the processor 124 may perform this request. Alternatively, the master trusted application 152 may install the base layer of trusted security functionality during the first step of provisioning above. In this way a subordinate trusted security zone 154 may be provisioned after manufacturing with an initial facilitation from the master trusted application 152 and the master trusted security zone 150.

The subordinate trusted security zones 154 may be used to support a variety of trusted applications and/or storage of confidential information. A subordinate trusted security zone 154 may be provisioned to support credit card transactions by installing a trusted application associated with the credit card and confidential information such as credit card account numbers, credit card authentication numbers in the subordinate trusted security zone 154 and/or in a portion of memory 122 dedicated to the subordinate trusted security zone 154. A subordinate trusted security zone 154 may be provisioned to support debit card transactions by installing a trusted application associated with the debit card and confidential information such as debit card account numbers, debit card personal identification number (PIN), and initializing an account funds balance in the subordinate trusted security zone 154 and/or in a portion of memory 122 dedicated to the subordinate trusted security zone 154. A subordinate trusted security zone 154 may be provisioned to support presenting and/or storing medical records. A subordinate trusted security zone 154 may be provisioned to present and/or to store a medical treatment regime. A subordinate trusted security zone 154 may be provisioned to support an interface and applications pack by installing one or more trusted applications associated with the interface and applications pack and confidential information in the subordinate trusted security zone 154 and/or in a portion of memory 122 dedicated to the subordinate trusted security zone 154. Interface and applications packs are discussed in more detail below.

The mobile device 102 may execute different interface and applications packs in different circumstances or in different contexts. For example, an enterprise interface and applications pack may be executed when the user is at work or during working hours, and a personal interface and applications pack may be executed when the user is out of work or outside of working hours. At least a portion of the subject interface and applications packs may execute in one of the subordinate trusted security zones 154, but other portions of the interface and applications packs may execute in the normal security zone 126. The different interface and applications packs active under different contexts may be referred to as different personas. The present disclosure contemplates the trusted security zone 128 supporting any number of personas, for example personas associated with affinity of the user to a professional sports team, one or more personal interests of the user such as astronomy, bird watching, stamp collecting, home cooking, and the like. Different personas may be associated with different users who may share a mobile device 102 and/or a computer 110. For example, a father may be associated with a first persona provisioned in a subordinate trusted security zone 154, a mother may be associated with a second persona provisioned in a different subordinated trusted security zone 154, and a child may be associated with a third persona provisioned in yet a different subordinate trusted security zone.

The system 100 may comprise other computers or servers coupled to the network 106 that may be associated with one or more of the subordinate trusted security zones 154 and/or the trusted applications 156, for example a server associated with one or more interface and applications pack, a server associated with an enterprise persona, a server associated with a private persona, a server associated with a medical record repository or source, a server associated with a medical treatment monitoring system, or other servers. These other computers or servers may be involved in provisioning and monitoring the trusted application 156 of the subordinate trusted security zone 154 that they are responsible for, analogously to the trusted service manager server 108.

In an embodiment, the subordinate trusted security zones 156 may not be initially created by the original equipment manufacturer of the processor 124. When a request is received by the master trusted application 152 to access a subordinate trusted security zone 154, for example from the trusted service manager server 108, the master trusted application 152 may allocate resources for and otherwise establish the subordinate trusted security zone 154. The master trusted application 152 may provision a base layer of trusted security functionality or utilities into the subordinate trusted security zone 154. Once established in this way, the provisioning of the subordinate trusted security zone 154 may be conducted as described above.

In an embodiment, one or more of the subordinate trusted security zones 154 may be dynamically scaled in size, for example a size or share of the trusted security zone 128 allocated to one or more of the subordinate trusted security zones 154 may be increased or decreased under some conditions. In an embodiment, some of the subordinate trusted security zones 154 may be allocated a static or fixed size while others of the subordinate trusted security zones 154 may be dynamically scalable in size. Alternatively, in an embodiment, all of the subordinate trusted security zones 154 may be dynamically scalable in size. In an embodiment, one or more of the subordinate trusted security zones 154 that are created and/or initialized by the original equipment manufacturer of the processor 124 may be configured to be dynamically scalable in size.

Under some circumstances, a manager of the trusted application 156, for example the trusted service manager server 108, may determine that more resources are desired for executing the trusted application 156 in the subordinate trusted security zone 154, for example more dedicated space of the trusted security zone 128 and/or a larger dedicated portion of the memory 122. The manager may send a request to the master trusted application 152 to increase the resources allocated to the subject trusted application 156 and/or the subject subordinate trusted security zone 154. The master trusted application 152 may expropriate resources previously allocated to a different subordinate trusted security zone 154 and/or different trusted application 156 and reallocate those resources to the requesting trusted application 156. For example, the trusted service manager 108 may request that the first subordinate trusted security zone 154a and/or the first trusted application 156a be allocated additional resources, and the master trusted application 152 may expropriate some of the resources previously allocated to the second subordinate trusted security zone 154b and/or the second trusted application 156b and reallocate these resources to the first subordinate trusted security zone 154a and/or the first trusted application 156a.

Alternatively, in an embodiment, the master trusted application 152 may expropriate and/or reduce the memory allocated to the first subordinate trusted security zone 154a and/or first trusted application 156a and increase the memory allocated to the second subordinate trusted security zone 154b and/or the second trusted application 156b based on a daily schedule or based on a context associated with the mobile device 102 or the computer 110. For example, when the working day is about to begin, the master trusted application 152 may expropriate resources from the private persona and reallocate these resources to the enterprise persona.

In an embodiment, each of the trusted applications 156 and/or the base layer of functionality installed in the subordinate trusted security zones 154 monitor their use of their own resources and provide a report of this usage to the master trusted application 152. In an embodiment, each subordinate trusted security zone 154 provides a report or a report update to the master trusted application 152 when the trusted application 156 discontinues executing. The resources may comprise a memory utilization or memory allocation in the memory 122. The resources may comprise a number of instructions per unit of time, for example a number of MIPS (millions of instructions per second) that the subject trusted application 156 consumes when executing. The trusted applications 156 and/or the base layer of the functionality installed in the subordinate trusted security zones 154 may generate a report of memory usage and/or of processor utilization. The master trusted application 152 may calculate or determine one or more figures of merit on the resource usage of the several subordinate trusted security zones 154 and/or the several trusted applications 156. The master trusted application 152 may determine an average resource usage, a windowed average resource usage, a maximum resource usage, an average of a predetermined number of maximum resource usage, a maximum resource usage that discards a predefined number of outlying maximums, or other figures of merit of resource usage for each subordinate trusted security zone 154. A windowed average may be calculated by averaging over a contiguous subset of values, for example a predefined number of the most recent set of values. For example, a windowed average of memory consumption may be determined by averaging the five most recent memory consumption determinations or by averaging the ten most recent memory consumption determinations.

Based on the figure of merit of resource usage of a subordinate trusted security zone 154 and/or trusted application 156, the master trusted application 152 may expropriate some of the previously allocated resources from that subordinate trusted security zone 154 and/or trusted application 156. In some cases the master trusted application 152 may expropriate some previously allocated resources from a plurality of subordinate trusted security zones 154 and/or trusted applications 156 in order to reduce the impact of the expropriation of resources on any single subordinate trusted security zone 154 and/or trusted application 156. The expropriated resources may then be reallocated to the requesting subordinate trusted security zone 154 and/or trusted application 156. For example, the master trusted application 152 may reduce the memory resources allocated to the first subordinate trusted security zone 154a and/or the first trusted application 156a based on a report of memory utilization provided by the first trusted application 156a and may increase the memory resources allocated to the second subordinate trusted security zone 154b and/or the second trusted application 156b.

The master trusted application 152 may be aware of the address ranges of resources, for example portions of the memory 122, that are allocated to the subordinate trusted security zones 154 and/or trusted applications 156. The master trusted application 152 may selectively target resources for expropriation to attempt to keep the resources allocated to the requesting subordinate trusted security application 154 and/or trusted application as nearly contiguous as possible.

Figure 3:
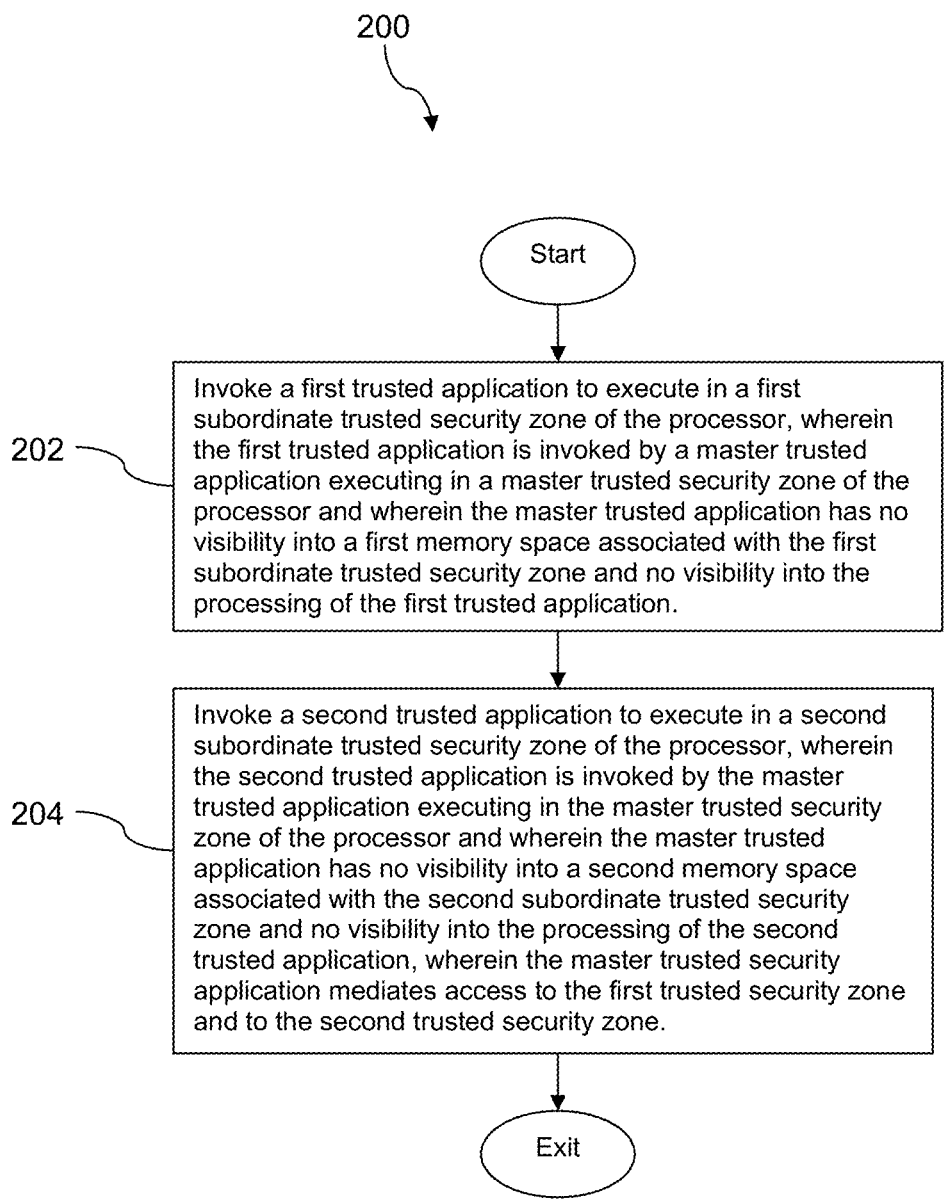
FIG. 3 is a flow chart of a method according to an embodiment of the disclosure.

Turning now to FIG. 3, a method 200 is described. At block 202, a first trusted application is invoked to execute in a first subordinate trusted security zone of the processor, wherein the first trusted application is invoked by a master trusted application executing in a master trusted security zone of the processor and wherein the master trusted application has no visibility into a first memory space associated with the first subordinate trusted security zone and no visibility into the processing of the first trusted application. The master trusted application may have knowledge of or visibility to an initial instruction to execute to invoke the first trusted application. At block 204, a second trusted application is invoked to execute in a second subordinate trusted security zone of the processor, wherein the second trusted application is invoked by the master trusted application executing in the master trusted security zone of the processor and wherein the master trusted application has no visibility into a second memory space associated with the second subordinate trusted security zone and no visibility into the processing of the second trusted application, wherein the first trusted application is different from the second trusted application. The master trusted application may have knowledge of or visibility to an initial instruction to execute to invoke the second trusted application. In some contexts it may be said that the master trusted security zone mediates access to the first trusted security zone and to the second trusted security zone. The first trusted application is different from the second trusted application.

Figure 4:
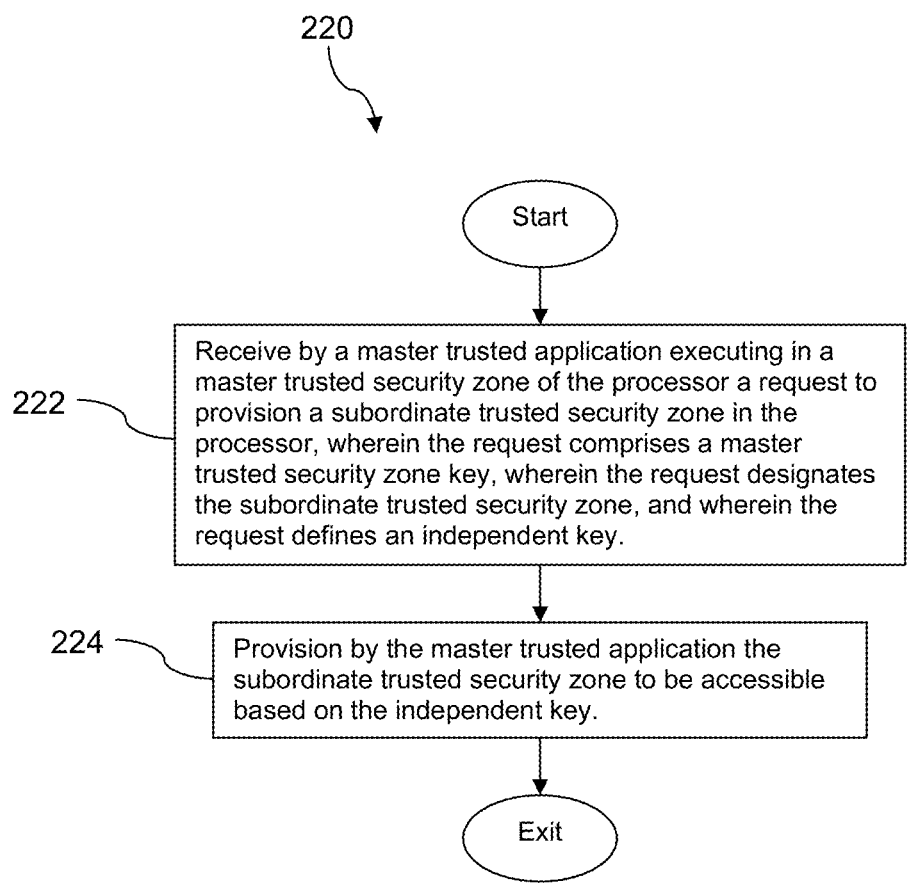
FIG. 4 is a flow chart of another method according to an embodiment of the disclosure.

Turning now to FIG. 4, a method 220 is described. At block 222, a master trusted application executing in a master trusted security zone of the processor receives a request to provision a subordinate trusted security zone in the processor, wherein the request comprises a master trusted security zone key, wherein the request designates the subordinate trusted security zone, and wherein the request defines an independent key. At block 224, the master trusted application provisions the subordinate trusted security zone to be accessible based on the independent key. Before block 222, the subordinate trusted security zone may be allocated structurally, for example be associated with a dedicated portion of memory, and may have base layer functionality and/or utilities installed, but the subordinate trusted security zone is not provisioned with a trusted application and is not accessible by any trusted service manager or other manager because no independent key has yet been provisioned to the subordinate trusted security zone. Alternatively, the master trusted application may provision the base layer functionality and/or utilities during the processing of block 224.

Figure 5:
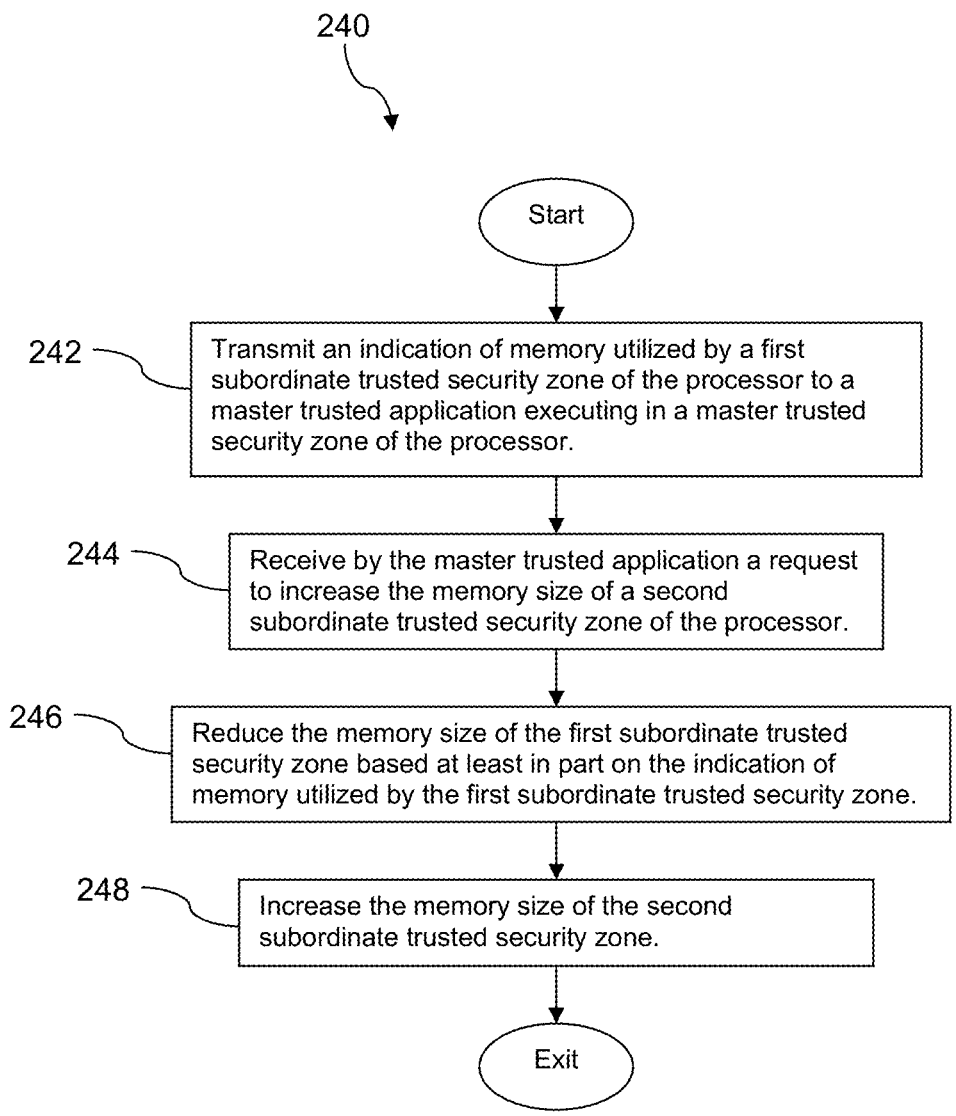
FIG. 5 is a flow chart of another method according to an embodiment of the disclosure.

Turning now to FIG. 5, a method 240 is described. At block 242, an indication of memory utilized by a first subordinate trusted security zone of the processor is transmitted to a master trusted application executing in a master trusted security zone of the processor. At block 244, the master trusted application receives a request to increase the memory size of a second subordinate trusted security zone of the processor. At block 246, the memory size of the first subordinate trusted security zone is reduced based at least in part on the indication of memory utilized by the first subordinate trusted security zone. At block 248, the memory size of the second subordinate trusted security zone is increased.

An interface and applications pack (IAP) comprises at least one of a media file, an application, a web widget, and a network service and may be used to customize the communication experience of using an electronic device. In an embodiment, the interface and applications pack comprises at least two of these enumerated elements. In another embodiment, the interface and applications pack comprises at least three of these enumerated elements. An interface and applications pack may be viewed as an aggregated set of applications, web widgets, network services, ring tones, ringback tones, alerting tones, wallpapers, interface controls, and other content targeted for the electronic device. In some contexts, the interface and applications pack may be referred to as an ID pack.

As an example, but not by way of limitation, an interface and applications pack may be produced by an enterprise such as a retail outlet or a media business to promote its business interests to wireless communication service subscribers. The interface and applications pack, when active on a electronic device, may provide a control to select a store mapping web widget that provides a map of the location of products within a retail store, where the map of the store is dynamically downloaded by the web widget based on a physical location of the electronic device and based on known locations of the retail stores operated by the enterprise. The map web widget may provide a control to select a search utility for finding the location of a specific product within a store.

The interface and applications pack may provide an application that automatically generates an electronic coupon and posts a notification about the coupon in a notifications display area of the electronic device. The application may generate the coupon and post the related notification based on determining that the physical location of the electronic device is in the proximity of a known retail store operated by the enterprise. Alternatively, the application may generate the coupon based on the passage of a period of time without the subscriber of the electronic device making a purchase from the enterprise and based on the day of the week, for example a Saturday when the subscriber of the electronic device has most often made purchases from the enterprise in the past. In an embodiment, the application may determine when the electronic device is in a retail store operated by the enterprise, establish a communication link with a corresponding application executing on a server in the retail store, and receive information about purchases made by the subscriber of the electronic device. This purchase information may be used in the process of generating coupons described above.

The interface and applications pack may provide controls to access a network application that promotes participation in relevant social media, for example to participate in a home improvement discussion forum sponsored by the subject retail store, to post photographs of home improvement projects the user has completed, and to post descriptions of the materials used and/or innovations applied to overcome peculiar problems. The interface and applications pack may provide controls to select videos posted to the home improvement social media site, for example video showing fundamental techniques of using tools.

The interface and applications pack may provide media files that define wall papers and themes that change the look and sounds of the electronic device. For example, the interface and application pack may include an audio file that defines an aural alert associated with receiving a short message service (SMS) message that is the sound of hammering. For example, the interface and application pack may include a picture file that defines the background of the display of the electronic device to be a photographic view of picturesque mountains seen through a 2×4 frame structure for a storage shed. These examples are provided to suggest the scope and power of the ID pack construct, but it is understood that a great variety of implementations of the ID pack are contemplated by the present disclosure. The interface and applications pack may include alerting tones that are played when selected events occur to alert a user, for example to alert the user that a simple message service (SMS) message has been received or to alert the user to an event or the approach of an event germane to the subject interface and applications pack.

The interface and applications pack may provide interface controls for selecting functionality provided as part of the interface and applications pack as well as for selecting functionality that may be provided by the electronic device independently of the interface and applications pack. For example, the interface and applications pack may provide a control for invoking an address book widget that is provided by the firmware of the electronic device or for invoking a voice call dialing functionality. Interface controls provided by the interface and applications pack that invoke functions provided by the electronic device itself, for example provided in firmware of the electronic device, may be referred to as encapsulated controls. Such encapsulation of controls by the interface and applications pack may promote a more complete adaptation of the communication experience.

The interface and applications pack further comprises an automatic self-installation routine that provides a user-friendly means to "stand up" the interface and applications pack for the electronic device. The self-installation routine may download applications, web widgets, ring tones, wallpapers, and other content to the electronic device. The self-installation routine may include instructions to automatically configure the device's home screens such as shortcuts, bookmarks, and widget placement. In an embodiment, a portion of the self-installation routine may execute partly in the network to provision and/or initialize network services, ringback tones, and other network-provided functionality associated with the interface and applications pack. For example, a portion of the self-installation routine may initialize and/or provision voice-mail changes. The portion of the self-installation routine that executes on the electronic device may invoke the portion of the self-installation routine that executes in the network. In an embodiment, a portion of the self-installation routine may be provided by a utility built into the basic firmware or software library of the electronic device and another portion of the self-installation routine may be provided as part of the specific interface and applications pack.

The interface and applications pack is experienced, at one level of abstraction, as a unity. For example, when a user selects an ID pack for installation on the electronic device, the user may perform a single selection action, and the self-installation routine may perform a number of separate and distinct actions to stand-up the selected ID pack that are not observed by the user. When the user selects an ID pack to be active, a currently active ID pack may be deactivated and the various distinct components of the selected ID pack may be brought into operation as a single global action, mediated by the automatic self-installation routine. The unity of experience may be further promoted by interactions among the several components of the ID pack. For example, selection of controls in a web widget of the ID pack may invoke playback of audios stored in media files of the ID pack; for example, execution of an application of the ID pack may trigger a modification of the wallpaper presented as a backdrop for the display of the electronic device.

An interface and applications pack may be tested to assure that the aggregation of media files, applications, web widgets, and network services interact appropriately with each other and do not impair other functionality of the electronic device.

The testing may verify that the interface and applications pack interoperates with a range of different electronic devices, standard firmware, and/or standard applications. In an embodiment, the service provider may impose a constraint that interface and applications packs be provided to the electronic device from a controlled content source so that the service provider can exercise oversight and quality control of interface and applications packs. In some contexts interface and applications packs may be referred to as IDs and/or as application packs. For further details about interface and applications packs, see U.S. patent application Ser. No. 13/023,486, filed Feb. 8, 2011, entitled "System and Method for ID Platform," by Jason R. Delker, et al., and U.S. patent application Ser. No. 12/876,221, filed Sep. 6, 2010, entitled "Dynamic Loading, Unloading, and Caching of Alternate Complete Interfaces," by Jason R. Delker, et al., both of which are incorporated herein by reference in their entirety.

Figure 6:
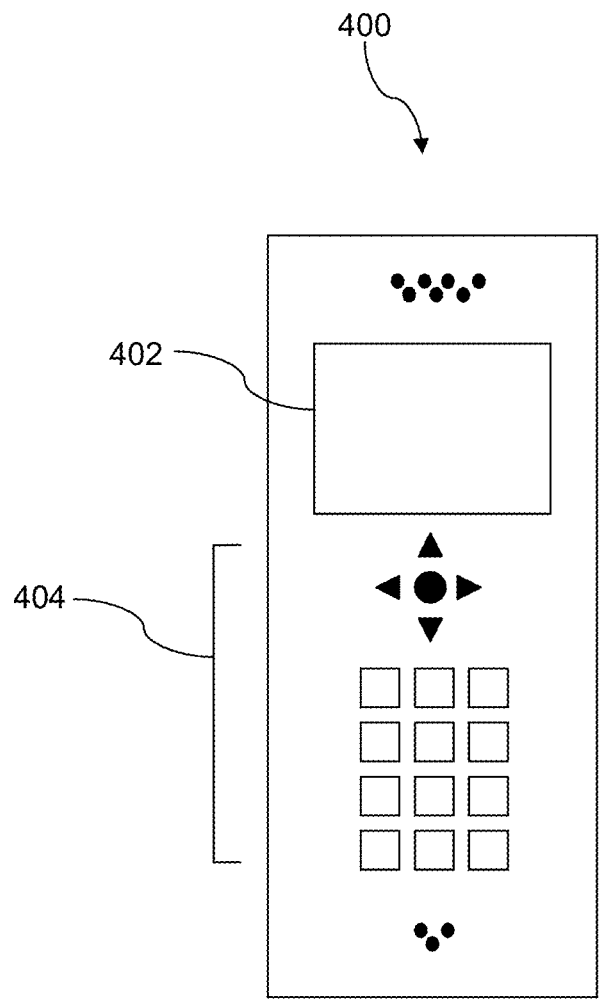
FIG. 6 is an illustration of a mobile communication device according to an embodiment of the disclosure.

FIG. 6 depicts a mobile device 400, which is operable for implementing aspects of the present disclosure, for example the mobile device 400, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 7:
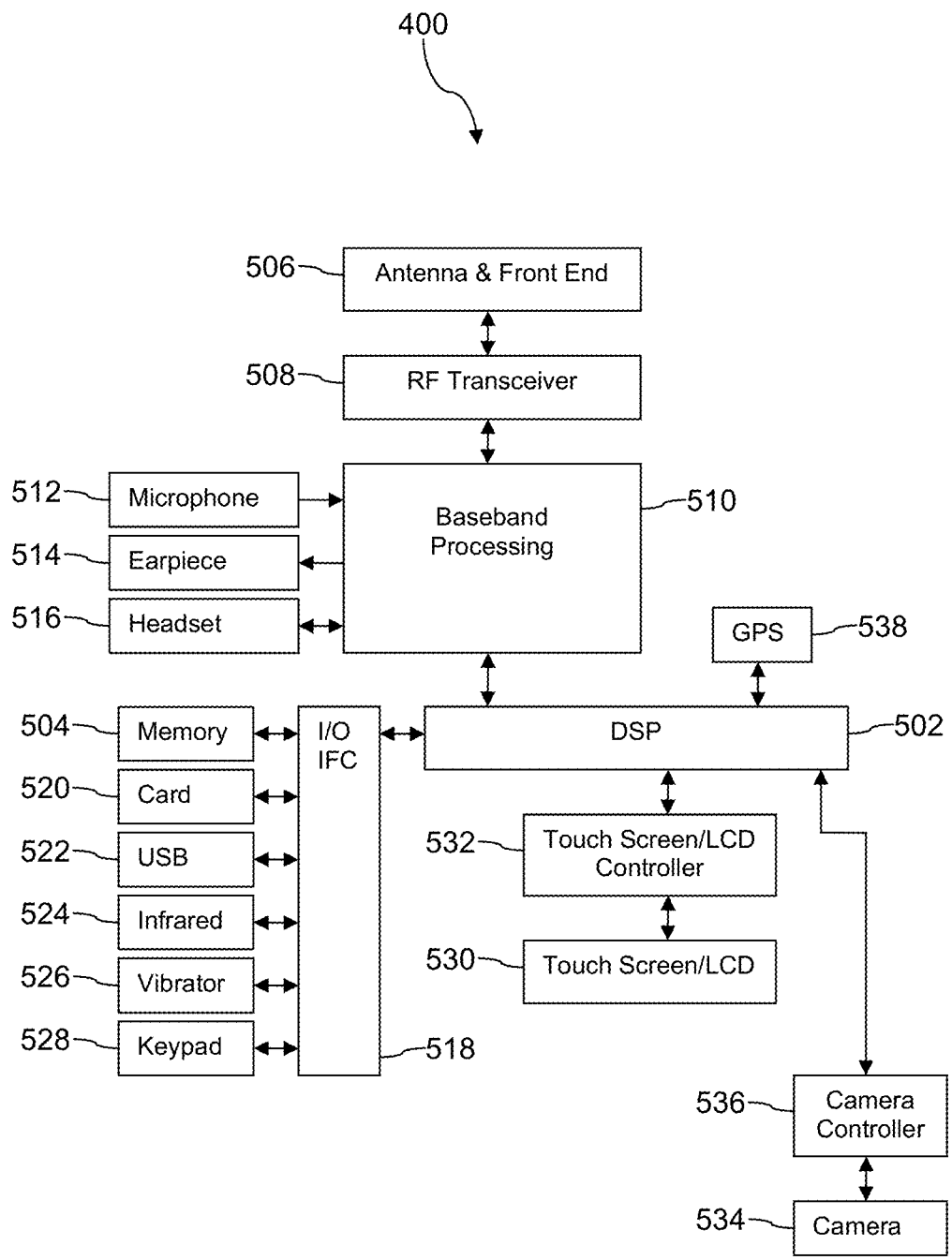
FIG. 7 is a block diagram of a mobile communication device according to an embodiment of the disclosure.

FIG. 7 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 8A:
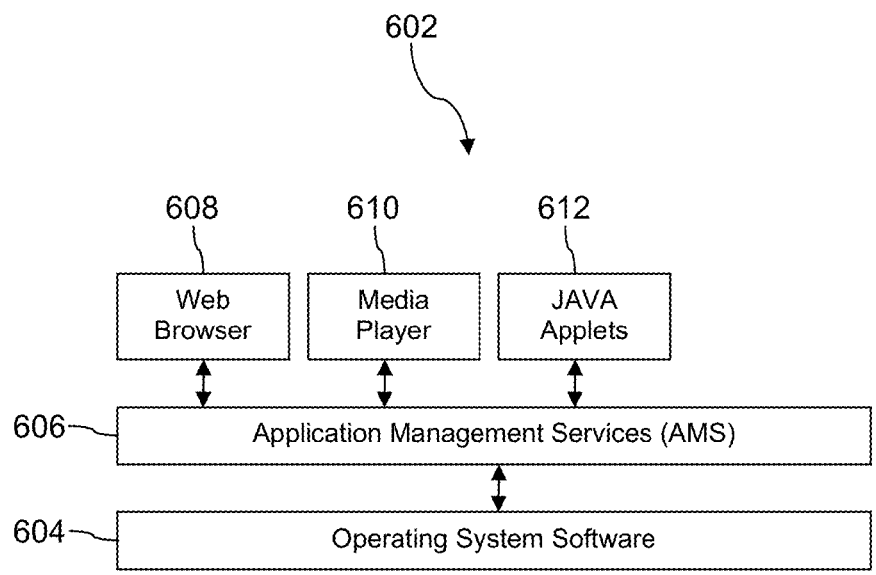
FIG. 8A is a block diagram of a software architecture of a mobile communication device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 8A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 8B:
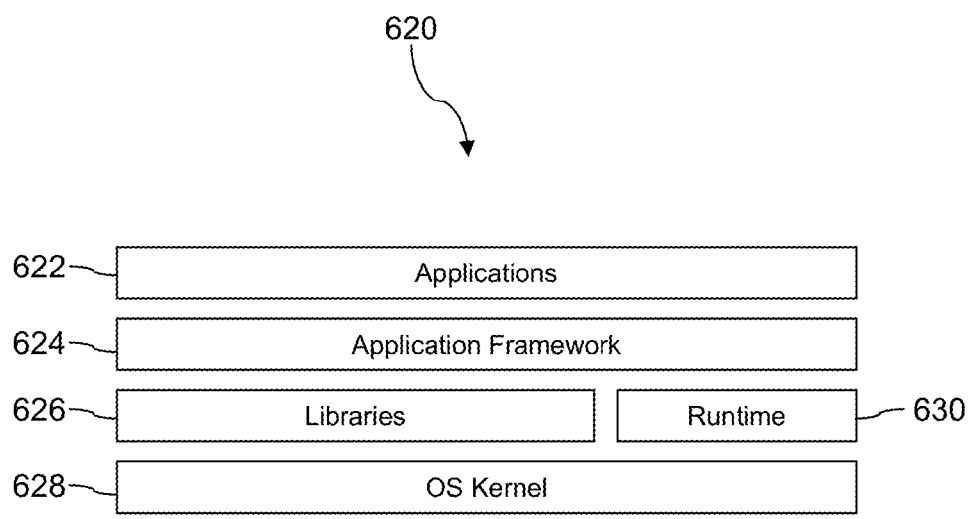
FIG. 8B is a block diagram of another software architecture according to an embodiment of the disclosure.

FIG. 8B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
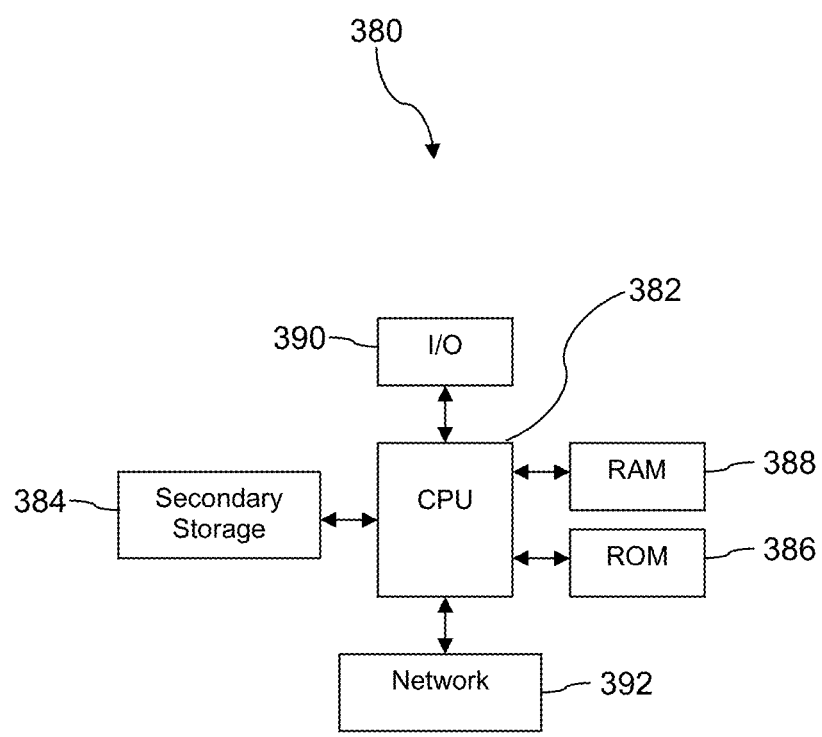
FIG. 9 is a block diagram of a computer system according to an embodiment of the disclosure.

FIG. 9 illustrates a computer system 380 suitable for implementing one or more embodiments disclosed herein, for example the computer 110 and the trusted service manager server 108. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/ or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/ or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of executing, on a mobile device comprising a radio transceiver and a processor, independent trusted applications in the processor having a trusted security zone that comprises a master trusted security zone having a master trusted security zone key, and a plurality of subordinate trusted security zones that each have a corresponding independent key, comprising:

invoking a first trusted application to execute in a first subordinate trusted security zone of the plurality of subordinate trusted security zones of the processor, the first subordinate trusted security zone comprising a first independent key that is the only key with permission to access the first subordinate trusted security zone, wherein the first trusted application is invoked by a master trusted application executing in the master trusted security zone of the processor, and wherein the master trusted application in the master trusted security zone has no access to a first memory space associated with the first subordinate trusted security zone and no access to the processing contents of the first trusted application in the first subordinate trusted security zone due to the master trusted security zone lacking the first independent key;

invoking a second trusted application to execute in a second subordinate trusted security zone of the plurality of subordinate trusted security zones of the processor, the second subordinate trusted security zone comprising a second independent key that is the only key with permission to access the second subordinate trusted security zone, wherein the second trusted application is invoked by the master trusted application executing in the master trusted security zone of the processor, and wherein the master trusted application in the master trusted security zone has no access to a second memory space associated with the second subordinate trusted security zone and no access to the processing contents of the second trusted application in the second subordinate trusted security zone due to the master trusted security zone lacking the second independent key;

mediating, by the master trusted security application, access to the first subordinate trusted security zone and to the second subordinate trusted security zone, wherein the processor having the trusted security zone is a main processor of the mobile device; and responsive to executing the first trusted application in the first subordinate trusted security zone, disabling, by the first trusted application while executing in the first subordinate trusted security zone, execution of all other trusted security zones including the master trusted security zone, execution of all other applications that execute outside of the first subordinate trusted security zone, and access to the radio transceiver that executes outside of any of the trusted security zones for establishing a wireless communication link, wherein the first trusted application in the first subordinate trusted security zone continues to execute while the master trusted security zone is disabled.

2. The method of claim 1, wherein the processor comprises a normal security zone that is separate from the trusted security zone, and wherein the trusted security zone is configured prevent execution of other applications that are configured to execute in the normal security zone responsive to an application executing in one of the master trusted security zone, the first subordinate trusted security zone, or the second subordinate trusted security zone.

3. The method of claim 1, wherein the first trusted application is associated with an enterprise computing persona of the mobile device and the second trusted application is associated with a private persona of the mobile device.

4. The method of claim 1, further comprising generating a report of memory utilization of the first subordinate trusted security zone.

5. The method of claim 4, further comprising the master trusted application reducing a memory allocation to the first subordinate trusted security zone and increasing a memory allocation to the second subordinate trusted security zone based on the report of memory utilization of the first subordinate trusted security zone.

6. The method of claim 1, further comprising:
receiving, by the master trusted application executing in the master trusted security zone of the processor, a request to provision the first subordinate trusted security zone in the processor, wherein the request comprises the master trusted security zone key, wherein the request designates the first subordinate trusted security zone, and wherein the request defines the first independent key for the first subordinate trusted security zone; and
provisioning, by the master trusted application based on the request, the first subordinate trusted security zone to be accessible based on the first independent key, wherein the provisioning is prior to the invoking the first trusted application.

7. The method of claim 6, wherein provisioning the first subordinate trusted security zone further comprises allocating, by the master trusted application, a quantity of trusted memory to the first subordinate trusted security zone, wherein contents of the trusted memory are not accessible by applications executing outside of the first subordinate trusted security zone.

8. The method of claim 7, further comprising:
receiving, by the master trusted application, a command to install the first trusted application in the first subordinate trusted security zone, wherein the command is accompanied by the first independent key; and
installing, by the master trusted application, the first trusted application in the trusted memory of the first subordinate trusted security zone based on the received command, wherein the installing is prior to the invoking the first trusted application.

9. The method of claim 1, wherein the first trusted application is one of a credit card application and a debit card application.

10. The method of claim 1, wherein the first trusted application is an enterprise network access application.

11. The method of claim 6, wherein the request to provision the first subordinate trusted security zone is received via a radio communication link.

12. The method of claim 1, wherein the plurality of subordinate trusted security zones comprises at least four subordinate trusted security zones.

13. The method of claim 1, further comprising:
transmitting an indication of memory utilized by the first subordinate trusted security zone of the processor to the master trusted application executing in the master trusted security zone of the processor;
receiving, by the master trusted application, a request to increase the memory size of the second subordinate trusted security zone of the processor;
reducing the memory size of the first subordinate trusted security zone based at least in part on the indication of memory utilized by the first subordinate trusted security zone; and
increasing the memory size of the second subordinate trusted security zone.

14. The method of claim 13, wherein transmitting the indication of memory utilized by the first subordinate trusted security zone is responsive to the first subordinate trusted security zone discontinuing execution.

15. The method of claim 13, further comprising determining an average memory utilized by the first subordinate trusted security zone based on the indication of memory utilized by the first subordinate trusted security zone, wherein reducing the memory size of the first subordinate trusted security zone is based on the average memory utilized by the first subordinate trusted security zone.

16. The method of claim 13, wherein the average memory utilized by the first subordinate trusted security zone is determined based on a predefined number of the most recently transmitted indications of memory utilized by the first subordinate trusted security zone.

17. The method of claim 13, further comprising determining a maximum quantity of memory utilized by the first subordinate trusted security zone based on the indication of memory utilized by the first subordinate trusted security zone, wherein reducing the memory size of the first subordinate trusted security zone is based on the maximum quantity of memory utilized by the first subordinate trusted security zone.

18. The method of claim 13, further comprising reducing the memory size of a third subordinate trusted security zone of the processor based at least in part on one of an average memory utilization of the third subordinate trusted security zone or a maximum memory utilization of the third subordinate trusted security zone determined from an indication of memory utilized by the third subordinate trusted security zone.

19. The method of claim 13, wherein reducing the memory size of the first subordinate trusted security zone is further based on a time schedule associated with a mobile device that comprises the processor having the trusted security zone.

20. The method of claim 1, wherein the master trusted security zone is configured to stop execution responsive to execution of any other trusted security zone of the mobile device.

* * * * *